(12) United States Patent
Oohashi et al.

(10) Patent No.: US 6,574,648 B1
(45) Date of Patent: Jun. 3, 2003

(54) DCT ARITHMETIC DEVICE

(75) Inventors: Masahiro Oohashi, Fukuoka (JP); Tsuyoshi Nakamura, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/601,803

(22) PCT Filed: Dec. 14, 1999

(86) PCT No.: PCT/JP99/07003

§ 371 (c)(1),
(2), (4) Date: Oct. 2, 2000

(87) PCT Pub. No.: WO00/36842

PCT Pub. Date: Jun. 22, 2000

(30) Foreign Application Priority Data

Dec. 14, 1998 (JP) .......................................... 10-355123

(51) Int. Cl.[7] .............................................. G06F 17/14
(52) U.S. Cl. ...................... 708/402; 708/401; 382/250
(58) Field of Search ............................... 708/402, 401; 382/250

(56) References Cited

U.S. PATENT DOCUMENTS

| | | | | |
|---|---|---|---|---|
| 5,107,345 A | * | 4/1992 | Lee ............................ 382/250 |
| 5,477,478 A | * | 12/1995 | Okamoto et al. ............ 708/402 |
| 5,894,430 A | * | 4/1999 | Ohara ......................... 708/402 |
| 6,282,555 B1 | * | 8/2001 | Ohara ......................... 708/401 |

FOREIGN PATENT DOCUMENTS

| | | |
|---|---|---|
| JP | 2-501601 | 5/1990 |
| JP | 04277932 | 10/1992 |
| JP | 09212484 | 8/1997 |
| JP | 09212485 | 8/1997 |
| JP | 10091615 | 4/1998 |
| WO | 88/07725 | 10/1988 |

OTHER PUBLICATIONS

M. Ohashi et al., A Study of Variable Length Base 1–Dimension DCT/IDCT Circuit, Mar. 1999, pp. 23–28.

* cited by examiner

*Primary Examiner*—David H. Malzahn
(74) *Attorney, Agent, or Firm*—Wenderoth, Lind & Ponack, L.L.P.

(57) ABSTRACT

There is provided a DCT processor for performing at least one of DCT operation and inverse DCT operation for image data in unit blocks having different sizes. This DCT processor is provided with a bit slice circuit (102) for outputting, bit by bit, the pixel data inputted for each column or row; a first butterfly operation circuit (103) for subjecting the output data of the bit slice circuit (102) to butterfly operation; a ROM address generation circuit (104) for generating continuous ROM addresses; an RAC (105) for reading the data corresponding to the ROM addresses from ROMs (ROM0–ROM7) and accumulating the data by accumulation circuits ($51a$–$51h$); and a second butterfly operation circuit 106 for subjecting the output data of the RAC 105 to butterfly operation.

22 Claims, 11 Drawing Sheets

Fig.4

| N.WORD \ address | idct | A7 | A6 | A5 | A4 | A3 | A2 | A1 | A0 |
|---|---|---|---|---|---|---|---|---|---|
| DCT, N=7, 128WORD | 0 | 0 | 0 | 0 | 0 | 0 | 0 | 0 | 0 |
| ~ | | | | | | | | | |
| | 0 | 0 | 1 | 1 | 1 | 1 | 1 | 1 | 1 |
| DCT, N=6, 64WORD | 0 | 1 | 0 | 0 | 0 | 0 | 0 | 0 | 0 |
| ~ | | | | | | | | | |
| | 0 | 1 | 0 | 1 | 1 | 1 | 1 | 1 | 1 |
| DCT, N=5, 32WORD | 0 | 1 | 1 | 0 | 0 | 0 | 0 | 0 | 0 |
| ~ | | | | | | | | | |
| | 0 | 1 | 1 | 0 | 1 | 1 | 1 | 1 | 1 |
| DCT, N=8, 16WORD | 0 | 1 | 1 | 1 | 0 | 0 | 0 | 0 | 0 |
| ~ | | | | | | | | | |
| | 0 | 1 | 1 | 1 | 0 | 1 | 1 | 1 | 1 |
| DCT, N=3, 8WORD | 0 | 1 | 1 | 1 | 1 | 0 | 0 | 0 | 0 |
| ~ | | | | | | | | | |
| | 0 | 1 | 1 | 1 | 1 | 0 | 1 | 1 | 1 |
| DCT, N=4, 4WORD | 0 | 1 | 1 | 1 | 1 | 1 | 0 | 0 | 0 |
| ~ | | | | | | | | | |
| | 0 | 1 | 1 | 1 | 1 | 1 | 0 | 1 | 1 |
| DCT, N=2, 2WORD | 0 | 1 | 1 | 1 | 1 | 1 | 1 | 0 | 0 |
| | 0 | 1 | 1 | 1 | 1 | 1 | 1 | 0 | 1 |
| unused | 0 | 1 | 1 | 1 | 1 | 1 | 1 | 1 | 0 |
| | 0 | 1 | 1 | 1 | 1 | 1 | 1 | 1 | 1 |
| inverse DCT, N=7, 128WORD | 1 | 0 | 0 | 0 | 0 | 0 | 0 | 0 | 0 |
| ~ | | | | | | | | | |
| | 1 | 0 | 1 | 1 | 1 | 1 | 1 | 1 | 1 |
| inverse DCT, N=6, 64WORD | 1 | 1 | 0 | 0 | 0 | 0 | 0 | 0 | 0 |
| ~ | | | | | | | | | |
| | 1 | 1 | 0 | 1 | 1 | 1 | 1 | 1 | 1 |
| inverse DCT, N=5, 32WORD | 1 | 1 | 1 | 0 | 0 | 0 | 0 | 0 | 0 |
| ~ | | | | | | | | | |
| | 1 | 1 | 1 | 0 | 1 | 1 | 1 | 1 | 1 |
| inverse DCT, N=8, 16WORD | 1 | 1 | 1 | 1 | 0 | 0 | 0 | 0 | 0 |
| ~ | | | | | | | | | |
| | 1 | 1 | 1 | 1 | 0 | 1 | 1 | 1 | 1 |
| inverse DCT, N=3, 8WORD | 1 | 1 | 1 | 1 | 1 | 0 | 0 | 0 | 0 |
| ~ | | | | | | | | | |
| | 1 | 1 | 1 | 1 | 1 | 0 | 1 | 1 | 1 |
| inverse DCT, N=4, 4WORD | 1 | 1 | 1 | 1 | 1 | 1 | 0 | 0 | 0 |
| ~ | | | | | | | | | |
| | 1 | 1 | 1 | 1 | 1 | 1 | 0 | 1 | 1 |
| inverse DCT, N=2, 2WORD | 1 | 1 | 1 | 1 | 1 | 1 | 1 | 0 | 0 |
| | 1 | 1 | 1 | 1 | 1 | 1 | 1 | 0 | 1 |
| unused | 1 | 1 | 1 | 1 | 1 | 1 | 1 | 1 | 0 |
| | 1 | 1 | 1 | 1 | 1 | 1 | 1 | 1 | 1 | one-dimensional DCT
in column direction
(8×1DCT)

interim result one-dimensional DCT
in row direction
(7×1DCT)

result of two-dimensional DCT one-dimensional inverse DCT
in column direction
(6×1 inverse DCT)

interim result result of two-dimensional DCT one-dimensional inverse DCT
in row direction
(4×1 inverse DCT)

DCT ARITHMETIC DEVICE

TECHNICAL FIELD

The present invention relates to a DCT processor which realizes discrete cosine transform (hereinafter referred to as DCT) used for data compression such as image signal processing and, more particularly, to a DCT processor which performs at least one of DCT operation and inverse DCT operation for image data in unit blocks having different sizes.

BACKGROUND ART

DCT is generally used for data compression of an image signal or the like. In data compression for video, generally, data compression utilizing intra-frame (spatial) correlation and data compression utilizing inter-frame (temporal) correlation are performed, and DCT corresponds to the former. DCT is a kind of frequency conversion method, that is, data compression is performed by removing high-frequency components utilizing the characteristics of pixel values such that relatively large pixel values concentrate on low-frequency components after conversion although pixel values disperse at random before conversion.

In DCT, initially, one image is divided into a plurality of unit blocks each having a predetermined shape and comprising a predetermined number of pixels (e.g., 8×8), and DCT is performed on every unit block. Two-dimensional DCT is executed by performing one-dimensional DCT twice. For example, the result of one-dimensional DCT performed on a unit block along its column direction is subjected to one-dimensional DCT along its row direction.

Further, the image signal compressed by DCT is decompressed by inverse DCT.

Formulae (1) and (2) define two-dimensional DCT and two-dimensional inverse ICT for an N×N unit block, respectively.

$$X(u, v) = 2/N \cdot C(u) \cdot C(v) \cdot \sum_{i=0}^{N-1} \sum_{j=0}^{N-1} x(i, j)\cos((2i+1)u\pi/2N)\cos((2j+1)v\pi/2N) \quad \text{formula (1)}$$

$$x(i, j) = 2/N \cdot \sum_{u=0}^{N-1} \sum_{v=0}^{N-1} \cdot C(v) \cdot X(u, v)\cos((2i+1)u\pi/2N)\cos((2j+1)v\pi/2N) \quad \text{formula (2)}$$

Further, formula (3) defines one-dimensional DCT which is derived from formulae (1) and (2).

$$X(u) = \sqrt{2/N} \cdot C(u) \cdot \sum_{i=0}^{N-1} x(i)\cos((2i+1)u\pi/2N) \quad \text{formula (3)}$$

In these formulae, x(i,j) (i,j=0,1,2, ... ,N−1) indicates pixels, and X(u,v) (C(0)=1/√ 2, C(u)=C(v)=1 (u,v=1,2, ... ,N−1)) indicates transform coefficients.

When N=8, the matrix operation of the one-dimensional DCT matrix according to formula (3) is represented by

N=8

$$\begin{pmatrix} X0 \\ X1 \\ X2 \\ X3 \\ X4 \\ X5 \\ X6 \\ X7 \end{pmatrix} = \begin{pmatrix} 0.353553 & 0.353553 & 0.353553 & 0.353553 & 0.353553 & 0.353553 & 0.353553 & 0.353553 \\ 0.490393 & 0.415735 & 0.277785 & 0.097545 & -0.097545 & -0.277785 & -0.415735 & -0.490393 \\ 0.461940 & 0.191342 & -0.191342 & -0.461940 & -0.461940 & -0.191342 & 0.191342 & 0.461940 \\ 0.415735 & -0.097545 & -0.490393 & -0.277785 & 0.277785 & 0.490393 & 0.097545 & -0.415735 \\ 0.353553 & -0.353553 & -0.353553 & 0.353553 & 0.353553 & -0.353553 & -0.353553 & 0.353553 \\ 0.277785 & -0.490393 & 0.097545 & 0.415735 & -0.415735 & -0.097545 & 0.490393 & -0.277785 \\ 0.191342 & -0.461940 & 0.461940 & -0.191342 & -0.191342 & 0.461940 & -0.461940 & 0.191342 \\ 0.097545 & -0.277785 & 0.415735 & -0.490393 & 0.490393 & -0.415735 & 0.277785 & -0.097545 \end{pmatrix} \begin{pmatrix} x0 \\ x1 \\ x2 \\ x3 \\ x4 \\ x5 \\ x6 \\ x7 \end{pmatrix} \quad \text{formula (4)}$$

When N=7, N=6, N=5, N=4, N=3, N=2, the matrix operations of the one-dimensional DCT are represented by

N=7

$$\begin{pmatrix} X0 \\ X1 \\ X2 \\ X3 \\ X4 \\ X5 \\ X6 \end{pmatrix} = \begin{pmatrix} 0.377964 & 0.377964 & 0.377964 & 0.377964 & 0.377964 & 0.377964 & 0.377964 \\ 0.521121 & 0.417907 & 0.231921 & 0.000000 & -0.231921 & -0.417907 & -0.521121 \\ 0.481588 & 0.118942 & -0.333269 & -0.534522 & -0.333269 & 0.118942 & 0.481588 \\ 0.417907 & -0.231921 & -0.521121 & -0.000000 & 0.521121 & 0.231921 & -0.417907 \\ 0.333269 & -0.481588 & -0.118942 & 0.534522 & -0.118942 & -0.481588 & 0.333269 \\ 0.231921 & -0.521121 & 0.417907 & 0.000000 & -0.417907 & 0.521121 & -0.231921 \\ 0.118942 & -0.333269 & 0.481588 & -0.534522 & 0.481588 & -0.333269 & 0.118942 \end{pmatrix} \begin{pmatrix} x0 \\ x1 \\ x2 \\ x3 \\ x4 \\ x5 \\ x6 \end{pmatrix} \quad \text{formula (5)}$$

N=6

$$\begin{pmatrix} X0 \\ X1 \\ X2 \\ X3 \\ X4 \\ X5 \end{pmatrix} = \begin{pmatrix} 0.408248 & 0.408248 & 0.408248 & 0.408248 & 0.408248 & 0.408248 \\ 0.557678 & 0.408248 & 0.149429 & -0.149429 & -0.408248 & -0.557678 \\ 0.500000 & 0.000000 & -0.500000 & -0.500000 & -0.000000 & 0.500000 \\ 0.408248 & -0.408248 & -0.408248 & 0.408248 & 0.408248 & -0.408248 \\ 0.288675 & -0.577350 & 0.288675 & 0.288675 & -0.577350 & 0.288675 \\ 0.149429 & -0.408248 & 0.557678 & -0.577678 & 0.408248 & -0.149429 \end{pmatrix} \begin{pmatrix} x0 \\ x1 \\ x2 \\ x3 \\ x4 \\ x5 \end{pmatrix}$$

formula (6)

N=5

$$\begin{pmatrix} X0 \\ X1 \\ X2 \\ X3 \\ X4 \end{pmatrix} = \begin{pmatrix} 0.447214 & 0.447214 & 0.447214 & 0.447214 & 0.447214 \\ 0.601501 & 0.371748 & 0.000000 & -0.371748 & -0.601501 \\ 0.511667 & -0.195440 & -0.632456 & -0.195440 & 0.511667 \\ 0.371748 & -0.601501 & -0.000000 & 0.601501 & -0.371748 \\ 0.195440 & -0.511667 & 0.632456 & -0.511667 & 0.195440 \end{pmatrix} \begin{pmatrix} x0 \\ x1 \\ x2 \\ x3 \\ x4 \end{pmatrix}$$

formula (7)

N=4

$$\begin{pmatrix} X0 \\ X1 \\ X2 \\ X3 \end{pmatrix} = \begin{pmatrix} 0.500000 & 0.500000 & 0.500000 & 0.500000 \\ 0.635281 & 0.270598 & -0.270598 & -0.635281 \\ 0.500000 & -0.500000 & -0.500000 & 0.500000 \\ 0.270598 & -0.635281 & 0.635281 & -0.270598 \end{pmatrix} \begin{pmatrix} x0 \\ x1 \\ x2 \\ x3 \end{pmatrix}$$

formula (8)

N=3

$$\begin{pmatrix} X0 \\ X1 \\ X2 \end{pmatrix} = \begin{pmatrix} 0.577350 & 0.707107 & 0.408248 \\ 0.577350 & 0.000000 & -0.816497 \\ 0.577350 & -0.707107 & 0.408248 \end{pmatrix} \begin{pmatrix} x0 \\ x1 \\ x2 \end{pmatrix}$$

formula (9)

N=2

$$\begin{pmatrix} X0 \\ X1 \end{pmatrix} = \begin{pmatrix} 0.707107 & 0.707107 \\ 0.707107 & -0.707107 \end{pmatrix} \begin{pmatrix} x0 \\ x1 \end{pmatrix}$$

formula (10)

On the other hand, the matrix operation of the one-dimensional inverse DCT in the case where N=8 is represented by

N=8

$$\begin{pmatrix} x0 \\ x1 \\ x2 \\ x3 \\ x4 \\ x5 \\ x6 \\ x7 \end{pmatrix} = \begin{pmatrix} 0.353553 & 0.490393 & 0.461940 & 0.415735 & 0.353553 & 0.277785 & 0.191342 & 0.097545 \\ 0.353553 & 0.415735 & 0.191342 & -0.097545 & -0.353553 & -0.490393 & -0.461940 & -0.277785 \\ 0.353553 & 0.277785 & -0.191342 & -0.490393 & -0.353553 & 0.097545 & 0.461940 & 0.415735 \\ 0.353553 & 0.097545 & -0.461940 & -0.277785 & 0.353553 & 0.415735 & -0.191342 & -0.490393 \\ 0.353553 & -0.097545 & -0.461940 & 0.277785 & 0.353553 & -0.415735 & -0.191342 & 0.490393 \\ 0.353553 & -0.277785 & -0.191342 & 0.490393 & -0.353553 & -0.097545 & 0.461940 & -0.415735 \\ 0.353553 & -0.415735 & 0.191342 & 0.097545 & -0.353553 & 0.490393 & -0.461940 & 0.277785 \\ 0.353553 & -0.490393 & 0.461940 & -0.415735 & 0.353553 & -0.277785 & 0.191342 & -0.097545 \end{pmatrix} \begin{pmatrix} X0 \\ X1 \\ X2 \\ X3 \\ X4 \\ X5 \\ X6 \\ X7 \end{pmatrix}$$

formula (11)

When N=7, N=6, N=5, N=4, N=3, and N=2, the matrix operations of the one-dimensional inverse DCT are represented by

N=7

$$\begin{pmatrix} x0 \\ x1 \\ x2 \\ x3 \\ x4 \\ x5 \\ x6 \end{pmatrix} = \begin{pmatrix} 0.377964 & 0.521121 & 0.481588 & 0.417907 & 0.333269 & 0.231921 & 0.118942 \\ 0.377964 & 0.417907 & 0.118942 & -0.231921 & -0.481588 & -0.521121 & -0.333269 \\ 0.377964 & 0.231921 & -0.333269 & -0.521121 & -0.118942 & 0.417907 & 0.481588 \\ 0.377964 & 0.000000 & -0.534522 & -0.000000 & 0.534522 & 0.000000 & -0.534522 \\ 0.377964 & -0.231921 & -0.333269 & 0.521121 & -0.118942 & -0.417907 & 0.481588 \\ 0.377964 & -0.417907 & 0.118942 & 0.231921 & -0.481588 & 0.521121 & -0.333269 \\ 0.377964 & -0.521121 & 0.481588 & -0.417907 & 0.333269 & -0.231921 & 0.118942 \end{pmatrix} \begin{pmatrix} X0 \\ X1 \\ X2 \\ X3 \\ X4 \\ X5 \\ X6 \end{pmatrix}$$

formula (12)

N=6

$$\begin{pmatrix} x0 \\ x1 \\ x2 \\ x3 \\ x4 \\ x5 \end{pmatrix} = \begin{pmatrix} 0.408248 & 0.557678 & 0.500000 & 0.408248 & 0.288675 & 0.149429 \\ 0.408248 & 0.408248 & 0.000000 & -0.408248 & -0.577350 & -0.408248 \\ 0.408248 & 0.149429 & -0.500000 & -0.408248 & 0.288675 & 0.557678 \\ 0.408248 & -0.149429 & -0.500000 & 0.408248 & 0.288675 & -0.577678 \\ 0.408248 & -0.408248 & -0.000000 & 0.408248 & -0.577350 & 0.408248 \\ 0.408248 & -0.557678 & 0.500000 & -0.408248 & 0.288675 & -0.149429 \end{pmatrix} \begin{pmatrix} X0 \\ X1 \\ X2 \\ X3 \\ X4 \\ X5 \end{pmatrix}$$

formula (13)

N=5

$$\begin{pmatrix} x0 \\ x1 \\ x2 \\ x3 \\ x4 \end{pmatrix} = \begin{pmatrix} 0.447214 & 0.601501 & 0.511667 & 0.371748 & 0.195440 \\ 0.447214 & 0.371748 & -0.195440 & -0.601501 & -0.511667 \\ 0.447214 & 0.000000 & -0.632456 & -0.000000 & 0.632456 \\ 0.447214 & -0.371748 & -0.195440 & 0.601501 & -0.511667 \\ 0.447214 & -0.601501 & 0.511667 & -0.371748 & 0.195440 \end{pmatrix} \begin{pmatrix} X0 \\ X1 \\ X2 \\ X3 \\ X4 \end{pmatrix}$$

formula (14)

N=4

$$\begin{pmatrix} x0 \\ x1 \\ x2 \\ x3 \end{pmatrix} = \begin{pmatrix} 0.500000 & 0.635281 & 0.500000 & 0.270598 \\ 0.500000 & 0.270598 & -0.500000 & -0.635281 \\ 0.500000 & -0.270598 & -0.500000 & 0.635281 \\ 0.500000 & -0.635281 & 0.500000 & -0.270598 \end{pmatrix} \begin{pmatrix} X0 \\ X1 \\ X2 \\ X3 \end{pmatrix}$$

formula (15)

N=3

$$\begin{pmatrix} x0 \\ x1 \\ x2 \end{pmatrix} = \begin{pmatrix} 0.577350 & 0.707107 & 0.408248 \\ 0.577350 & 0.000000 & -0.816497 \\ 0.577350 & -0.707107 & 0.408248 \end{pmatrix} \begin{pmatrix} X0 \\ X1 \\ X2 \end{pmatrix}$$

formula (16)

N=2

$$\begin{pmatrix} x0 \\ x1 \end{pmatrix} = \begin{pmatrix} 0.707107 & 0.707107 \\ 0.707107 & -0.707107 \end{pmatrix} \begin{pmatrix} X0 \\ X1 \end{pmatrix}$$

formula (17)

FIG. 8 is a block diagram for explaining an example of a conventional DCT processor, illustrating the structure of the DCT processor. In FIG. 8, a DCT processor 1 comprises 8-bit input registers 2a, 2b, 2c, 2d, 2e, 2f, 2g and 2h for latching input image data; 8-bit holding registers 3a, 3b, 3c, 3d, 3e, 3f, 3g and 3h for latching the output data from the respective input registers 2a, 2b, 2c, 2d, 2e, 2f, 2g and 2h and, thereafter, shift-outputting the data, bit by bit, from the least significant bit (hereinafter referred to as "LSB") of each output data; ROM accumulators (hereinafter referred to as "RAC") 4a, 4b, 4c, 4d, 4e, 4f, 4g and 4h for accumulating the data in ROMs (Read Only Memories) 41a~41h by accumulators 42a~42h, with the output data from the respective holding registers 3a, 3b, 3c, 3d, 3e, 3g, 3g and 3h as 8-bit addresses; and output registers 5a, 5b, 5c, 5d, 5e, 5f, 5g and 5h for latching the output data from the respective RACs 4a, 4b, 4c, 4d, 4e, 4f, 4g and 4h and outputting these data.

Further, the respective RACs 4a, 4b, 4c, 4d, 4e, 4f, 4g and 4h comprise ROMs 41a~41h each having a table of $2^8$ data including the sum of the products obtained by multiplying the column coefficients in the matrix operation by the respective bits of the pixel data constituting the input column or row; and accumulators 42a~42h for accumulating the outputs from the respective ROMs 41a~41h.

The conventional DCT processor employs the DA (Distributed Arithmetic) method for the matrix operation. This DA method is efficient for the product-sum operation of fixed coefficients. In this method, the product-sum operation between each input pixel data and the fixed coefficients is performed not in word units but in bit string units. A bit string comprising the bits of each input pixel data is used as an address, and the partial product corresponding to this address is read from the ROM which stores the partial products as a table, and the bits from the LSB (Least Significant Bit) to the MSB (Most Significant Bit) are accumulated to realize the product-sum operation of fixed coefficients. In this DCT processor, the partial products obtained by multiplying the bit strings constituted by the respective bits of the input pixel data of N or M pixels by the row coefficients of the DCT coefficients are stored as tables in the respective ROMs 41a~41h of the RACs 4a~4h, in association with the respective row coefficients of the DCT coefficients. By inputting the bit strings of N or M bits constituted by the respective bits of the input pixel data of N or M pixels as addresses in the respective ROMs 41a~41h, the partial products are output from the ROMs 41a~41h, and these partial products are sequentially output from the LSB to the MSB of the respective pixel data, and accumulated, whereby the result of the one-dimensional DCT is obtained.

Next, the operation will be described.

Initially, the input register 2a latches 8-bit input pixel data, and shift operation is performed in every input cycle, from the input register 2a to the input register 2b, from the input register 2b to the input register 2c, . . . , until the pixel data is latched by all of the input registers 2a, 2b, 2c, 2d, 2e, 2f, 2g, and 2h. Thereafter, the input registers 2a, 2b, 2c, 2d, 2e, 2f, 2g, and 2h output the latched pixel data to the corresponding holding registers 3a, 3b, 3c, 3d, 3e, 3f, 3g, and 3h. In parallel with the next 8 pieces of input pixel data being latched by the input registers 2a, 2b, 2c, 2d, 2e, 2f, 2g, and 2h, the holding registers 3a, 3b, 3c, 3d, 3e, 3f, 3g, and 3h output the latched 8-bit pixel data, bit by bit, from the LSB. With the 8-bit data outputted from the holding registers 3a, 3b, 3c, 3d, 3e, 3f, 3g, and 3h as addresses, the ROMs 41a, 41b, 41c, 41d, 41e, 41f, 41g, and 41h output ROM data corresponding to these addresses. The accumulators 42a, 42b, 42c, 42d, 42e, 42f, 42g, and 42h latch the 8-bit ROM data outputted from the corresponding ROMs 41a, 41b, 41x, 41d, 41e, 41f, 41g, and 41h, and output 8-bit data. The output registers 5a, 5b, 5c, 5d, 5e, 5f, 5g, and 5h corresponding to the RACs 4a, 4b, 4c, 4d, 4e, 4f, 4g, and 4h latch the data outputted from the accumulators 42a, 42b, 42c, 42d, 42e, 42f, 42g, and 42h, respectively, and perform sequential shift operation from the output register 5h to the output register 5g, from the output register 5g to the output register 5f, . . . , to output the latched data.

When performing two-dimensional DCT on pixel data in a unit block comprising 8×8 pixels by using the DCT processor 1, initially, a series of operations are performed eight times for every eight pieces of pixel data in the column direction to obtain 64 interim results and, thereafter, one-dimensional DCT is performed on the 64 interim results in the row direction.

However, in order to perform one-dimensional DCT or inverse DCT on a unit block comprising 8×8 pixels, the conventional DCT processor should have 8 tables each containing 256 pieces of ROM data when each input pixel data has 8 bits. When both of DCT and inverse DCT are performed by one DCT processor, the processor should have 8 tables each having 512 pieces of ROM data. Further, in recent years, there is a demand for variable size of a unit block, depending on the standard of video data compression. However, the above-described DCT processor is applicable to only pixel data having 8×8 pixels as a unit block. So, in order to process pixel data having, as a unit block, 7×7 pixels, 6×6 pixels, 5×5 pixels, and 4×4 pixels, DCT processors having 7 tables of 256 pieces of ROM data, six tables of 128 pieces of ROM data, five tables of 64 pieces of ROM data, and four tables of 32 pieces of ROM data are required, respectively. Accordingly, in order to perform DCT and inverse DCT on pixel data in unit blocks each comprising arbitrarily selected N×M pixels, a plurality of DCT processors are required, whereby the circuit scale is considerably increased.

The present invention is made to solve the above-described problems and it is an object of the present invention to provide a DCT processor having a relatively small circuit scale, which can perform DCT or inverse DCT on image data in unit blocks having different sizes.

DISCLOSURE OF THE INVENTION

The present invention is a DCT processor performing one-dimensional DCT operation or one-dimensional inverse DCT operation on pixel data of image data in unit blocks each comprising N×M pixels (N,M: arbitrary integers from 1 to 8). This DCT processor comprises: bit slice means for receiving the pixel data of the image data in each N×M unit block for each row or column, and slicing, bit by bit, the respective pixel data constituting the input rows or columns, and outputting the sliced pixel data; control means for outputting a control signal which includes the number of input pixel data that is the number of pixel data constituting each input row or column, and a value indicating that either the DCT operation or the inverse DCT operation is to be performed; first butterfly operation means for subjecting the output data from the bit slice means to the butterfly operation and outputting the result of the butterfly operation in the case where the control signal outputted from the control means indicates that the number of input pixel data is a power of 2 and that the DCT operation is to be performed, and in the cases other than mentioned above, the first butterfly operation means performing no butterfly operation and outputting the output data of the bit slice means as it is; address generation means for generating addresses on the basis of bit strings obtained from the output data of the first butterfly operation means, and the number of input pixel data and the value indicating that either the DCT operation or the inverse DCT operation is to be performed, which are included in the control signal; operation means having eight sets of multiplication result output means and accumulation means, the multiplication result output means outputting the results of multiplication to be used for obtaining the results of the one-dimensional DCT and inverse DCT operations, in accordance with the above-described addresses, and the accumulation means accumulating the output data from the multiplication result output means and outputting the accumulated data; and second butterfly operation means for subjecting the output data from the operation means to the butterfly operation and outputting the result of the butterfly operation after rearranging it according to the order of input pixel data in the case where the control signal outputted from the control means indicates that the number of input pixel data is a power of 2 and that the inverse DCT operation is to be performed, and in the cases other than mentioned above, the second butterfly operation means performing no butterfly operation and outputting the output data of the operation means after rearranging it according to the order of input pixel data. Therefore, the quantity of data to be the result of multiplication used for obtaining the result of DCT operation and the result of inverse DCT operation is reduced, whereby the data capacity of the multiplication result output means for outputting this data is reduced, resulting in a DCT processor having reduced circuit scale.

Further, in the present invention, on the basis of the output data from the first butterfly operation means, and the number of input pixel data, and the value indicating that either the DCT operation or the inverse DCT operation is to be performed, the address generation means generates addresses as follows. When the control signal indicates that the number of input pixel data is any of 7, 6, 5, and 3, the address generation means generates an address by adding a header address of 2 bits, 3 bits, 4 bits, or 6 bits which indicates the value of the number of input pixel data including the value indicating either the DCT operation or the inverse DCT operation, to a bit string of 7 bits, 6 bits, 5 bits, or 3 bits which is constituted based on the output data from the first butterfly operation means, respectively. When the control signal indicates that the number of input pixel data is any of 8, 4, and 2 and the DCT operation is to be performed, the address generation means generates an address by adding a header address of 5 bits, 7 bits, or 8 bits which indicates the value of the number of input pixel data including the value indicating that the DCT operation is to be performed, to a bit string of 4 bits, 2 bits, or 1 bit which is constituted based on the result of addition obtained in the butterfly operation by the butterfly operation means, and to a bit string of 4 bits, 2 bits, or 1 bit which is constituted based on the result of subtraction obtained in the butterfly operation, respectively. When the control signal indicates that the number of input pixel data is any of 8, 4, and 2 and the inverse DCT operation is to be performed, the address generation means generates an address by adding a header address of 5 bits, 7 bits, or 8 bits which indicates the value of the number of input pixel data including the value indicating that the inverse DCT operation is to be performed, to a bit string of 4 bits, 2 bits, or 1 bit which is constituted based on the output of 8 bits, 4 bits, or 2 bits from the first butterfly operation means, respectively. The header addresses are bit strings which permit all of the addresses obtained by adding the header addresses to the addresses based on the output data from the first butterfly operation means, to become continuous addresses. Therefore, the multiplication result output means can be efficiently mapped so that no useless area is generated in the multiplication result output means, and thus the size of the multiplication result output means is reduced, whereby the circuit scale of the DCT processor is further reduced.

Further, in the present invention, the multiplication result output means outputs the results of multiplication as follows. When the control signal outputted from the control means indicates that the number of input pixel data is a power of 2 and the DCT operation is to be performed, the multiplication result output means outputs the result of multiplication with respect to the bit strings obtained from the output data of the first butterfly operation means, according to the DCT matrix operation using fast Fourier transform. When the control signal outputted from the control means indicates that the number of input pixel data is a value other than a power of 2 and the DCT operation is to be performed, the multiplication result output means outputs the result of multiplication with respect to the bit strings obtained from the output data of the first butterfly operation means, according to the DCT matrix operation. When the control signal outputted from the control means indicates that the number of input pixel data is a power of 2 and the inverse DCT operation is to be performed, the multiplication result output means outputs the result of multiplication with respect to the bit strings obtained from the output data of the first butterfly operation means, according to the inverse DCT matrix operation using fast Fourier transform. When the control signal outputted from the control means indicates that the number of input pixel data is a value other than a power of 2 and the inverse DCT operation is to be performed, the multiplication result output means outputs the result of multiplication with respect to the bit strings obtained from the output data of the first butterfly operation means, according to the inverse DCT matrix operation. Therefore, the circuit scale of the DCT processor is further reduced.

Further, in the present invention, when the control signal indicates that the number of input pixel data is a value other than 8, the operation of means which is not used for the operation is halted. Therefore, the power consumption is reduced.

Further, the present invention is a DCT processor performing one-dimensional DCT operation on pixel data of image data in unit blocks each comprising N×M pixels (N,M: arbitrary integers not less than 1). This DCT processor comprises: bit slice means for receiving the pixel data of the image data in each N×M unit block for each row or column, and slicing, bit by bit, the respective pixel data constituting the input rows or columns, and outputting the sliced pixel data; control means for outputting a control signal which indicates the number of input pixel data that is the number of pixel data constituting each input row or column; butterfly operation means for performing butterfly operation on the output data from the bit slice means and outputting the result of the butterfly operation in the case where the control signal outputted from the control means indicates that the number of input pixel data is a power of 2, and in the cases other than mentioned above, the butterfly operation means performing no butterfly operation and outputting the output data of the bit slice means as it is; address generation means for generating. addresses by using bit strings obtained from the output data of the first butterfly operation means, and the number of input pixel data included in the control signal; operation means having plural sets of multiplication result output means and accumulation circuits, as many as the maximum value of the number of input pixel data, the multiplication result output means outputting the results of multiplication to be used for obtaining the result of one-dimensional DCT operation,. in accordance with the above-described addresses, and the accumulation circuits accumulating the results of multiplication outputted from the respective multiplication result output means and outputting the accumulated results; and output means for rearranging the output data of the operation means according to the order of input pixel data, and outputting the rearranged data as the result of one-dimensional DCT operation. Therefore, the quantity of data to be the result of multiplication used for obtaining the result of DCT operation is reduced, whereby the data capacity of the multiplication result output means for outputting this data is reduced, resulting in a DCT processor having reduced circuit scale.

Further, in the present invention, on the basis of the output data from the first butterfly operation means and the number of input pixel data, the address generation means generates addresses as follows. When the control signal indicates that the number of input pixel data is a value other than a power of 2, the address generation means generates an address by adding a header address for indicating the number of input pixel data, to an address having the number of bits equal to the number of input pixel data, which is constituted based on the output data from the first butterfly operation means. When the control signal indicates that the number of input pixel data is a power of 2, the address generation means generates an address by adding a header address for indicating the number of input pixel data, to a bit string having the number of bits equal to half of the number of input pixel data, which is constituted based on the result of the addition obtained in the butterfly operation by the first butterfly operation means, and to a bit string having the number of bits equal to half of the number of input pixel data, which is constituted based on the result of the subtraction obtained in the butterfly operation. The header addresses are bit strings which permit all of the addresses obtained by adding the header addresses to the addresses based on the output data from the first butterfly operation means, to become continuous addresses and have the number of bits equal to the maximum value of the number of input pixel data. Therefore, the multiplication result output means can be efficiently mapped so that no useless area is generated in the multiplication result output means, and thus the size of the multiplication result output means is reduced, whereby the circuit scale of the DCT processor is further reduced.

Further, in the present invention, the butterfly operation means performs butterfly operation for outputting the values obtained by sequentially adding and subtracting the pixel data, which have been input for each row or column to the bit slice means and sliced bit by bit to be output, starting from the both ends of the input row or column toward the inside. Therefore, the circuit scale of the DCT processor is further reduced.

Further, in the present invention, the multiplication result output means outputs the result of multiplication as follows.

When the control signal outputted from the control means indicates that the number of input pixel data is a power of 2, the multiplication result output means outputs the result of multiplication with respect to the bit strings obtained from the output data of the first butterfly operation means according to the DCT matrix operation using fast Fourier transform. When the control signal indicates that the number of input pixel data is a value other than a power of 2, the multiplication result output means outputs the result of multiplication with respect to the bit strings obtained from the output data of the first butterfly operation means according to the DCT matrix operation. Therefore, the circuit scale of the DCT processor is further reduced.

Further, the present invention is a DCT processor performing one-dimensional inverse DCT operation on pixel data of image data in unit blocks each comprising N×M pixels (N,M: arbitrary integers not less than 1). This DCT processor comprises: bit slice means for receiving the pixel data of the image data in each N×M unit block for each row or column, and slicing, bit by bit, the respective pixel data constituting the input rows or columns, and outputting the sliced pixel data; control means for outputting a control signal which includes the number of input pixel data that is the number of pixel data constituting each input row or column; address generation means for generating addresses using bit strings obtained from the output data of the bit slice means, and the number of input pixel data included in the control signal; operation means having plural sets of multiplication result output means and accumulation circuits, as many as the maximum value of the number of input pixel data, the multiplication result output means outputting the results of multiplication to be used for obtaining the result of one-dimensional DCT operation in accordance with the above-described addresses, and the accumulation circuits accumulating the results of multiplication outputted from the respective multiplication result output means and outputting the accumulated results; and butterfly operation means for performing butterfly operation on the output data from the operation means and outputting the result of the butterfly operation after rearranging it according to the order of input pixel data in the case where the control signal outputted from the control means indicates that the number of input pixel data is a power of 2, and in the cases other than mentioned above, the butterfly operation means performing no butterfly operation and outputting the output data of the operation means after rearranging it according to the order of input pixel data. Therefore, the quantity of data to be the result of multiplication used for obtaining the result of inverse DCT operation is reduced, whereby the data capacity of the multiplication result output means for outputting this data is reduced, resulting in a DCT processor having reduced circuit scale.

Further, in the present invention, on the basis of the output data from the bit slice means and the number of input pixel data, the address generation means generates addresses as follows. When the control signal indicates that the number of input pixel data is a value other than a power of 2, the address generation means generates an address by adding a header address for indicating the number of input pixel data, to an address having the number of bits equal to the number of input pixel data, which is constituted based on the output data of the bit slice means. When the control signal indicates that the number of input pixel data is a power of 2, the address generation means generates an address by adding a header address for indicating the number of input pixel data, to a bit string having the number of bits equal to half of the number of input pixel data, which is constituted based on the output data from the bit slice means. The header addresses are bit strings which permit all of the addresses obtained by adding the header addresses to the addresses based on the output data of the bit slice means to become continuous addresses and have the number of bits equal to the maximum value of the number of input pixel data constituting the input row or column. Therefore, the multiplication result output means can be efficiently mapped so that no useless area is generated in the multiplication result output means, and thus the size of the multiplication result output means is reduced, whereby the circuit scale of the DCT processor is further reduced.

Further, in the present invention, the butterfly operation, means performs butterfly operation for outputting the value obtained by addition and the value obtained by subtraction, which addition and subtraction are performed between the value obtained by accumulating the result of multiplication based on the odd-numbered pixel data amongst the pixel data input for each row or column, and the value obtained by accumulating the result of multiplication based on the even-numbered pixel data. Therefore, the circuit scale of the DCT processor is further reduced.

Further, in the present invention, the multiplication result output means outputs the result of multiplication as follows. When the control signal outputted from the control means indicates that the number of input pixel data is a power of 2, the multiplication result output means outputs the result of multiplication with respect to the bit strings obtained from the output data of the first butterfly operation means according to the inverse DCT matrix operation using fast Fourier transform. When the control signal indicates that the number of input pixel data is a value other than a power of 2, the multiplication result output means outputs the result of multiplication with respect to the bit strings obtained from the output data of the first butterfly operation means according to the inverse DCT matrix operation. Therefore, the circuit scale of the DCT processor is further reduced.

Further, in the present invention, the unit block of the image data to be input to the bit slice means is a unit block each comprising N×M pixels (N,M: arbitrary integers from 1 to 8); and the operation means includes eight sets of multiplication result output means and accumulation means, which is equal to the maximum value of the number of input pixel data. Therefore, the circuit scale of the DCT processor is further reduced.

Further, in the present invention, the bit slice means receives 16-bit data as each pixel data to be input, slices this 16-bit data for every two bits, and outputs the sliced data; and the operation means is provided with, as each of the multiplication result output means, two multiplication result output units placed in parallel with each other, each outputting the result of multiplication, and data obtained by adding the outputs of the two multiplication result output units is accumulated by the corresponding accumulation means. Therefore, the circuit scale of the DCT processor is further reduced when the input pixel data is 16-bit data.

Further, in the present invention, when the control signal indicates that the number of input pixel data is equal to a value other than the maximum value of the number of input pixel data, the operation of means to be unused is halted. Therefore, the power consumption is reduced.

BRIEF DESCRIPTION OF THE DRAWINGS

FIG. 4 is a map of ROM addresses according to the first embodiment of the present invention;

BEST MODE TO EXECUTE THE INVENTION

Figure 1:
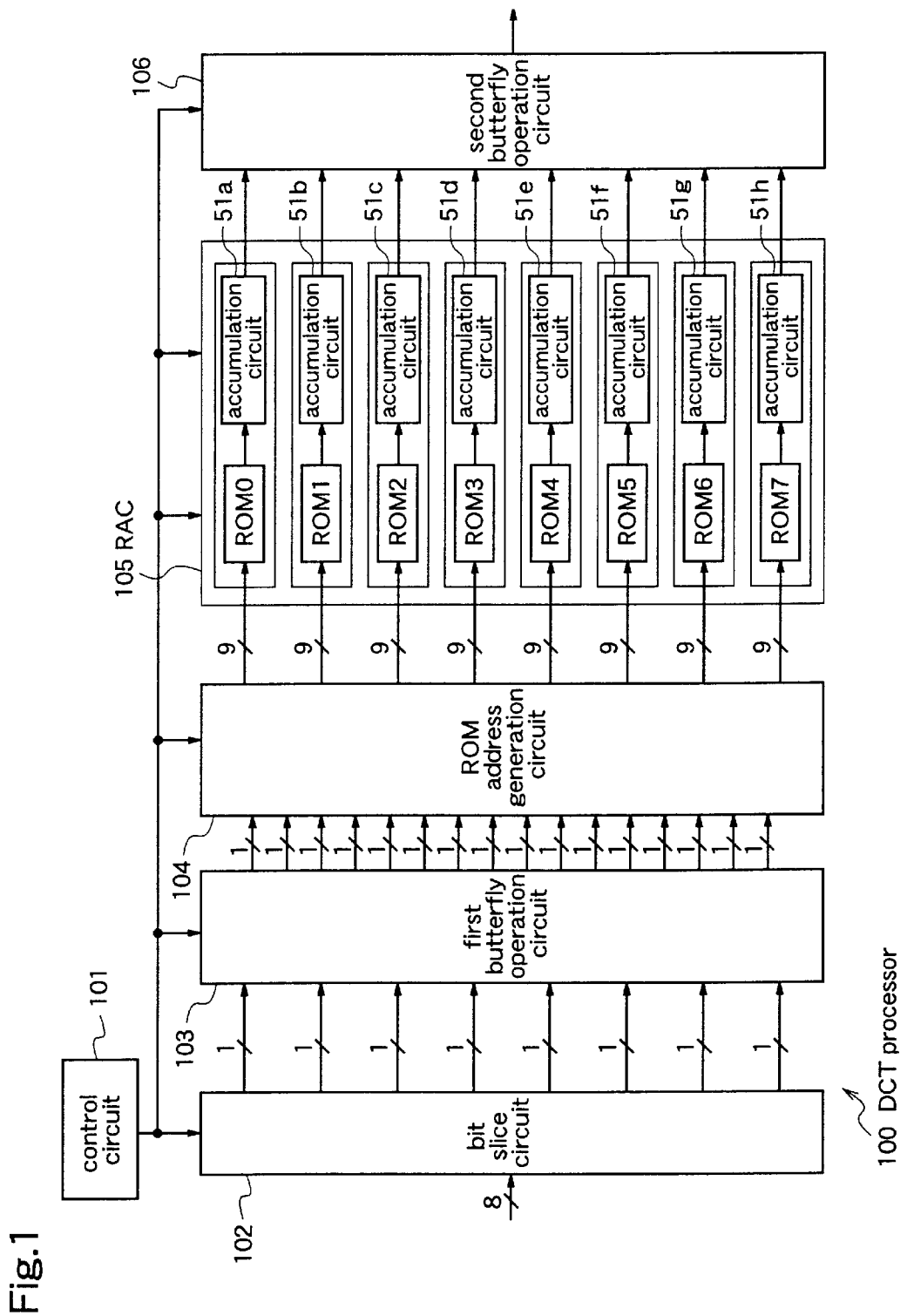
FIG. 1 is a block diagram illustrating the structure of a DCT processor according to a first embodiment of the present invention.

Embodiment 1.

A DCT processor according to a first embodiment receives pixel data of unit blocks each comprising N×M (N,M: arbitrary integers from 1 to 8) pieces of pixels, for every column or row, and performs DCT or inverse DCT operation on these pixel data. This DCT processor utilizes frequency sampling type fast Fourier transform (hereinafter, referred to as "FFT") especially when N or M is a power of 2, i.e., when N=8, N=4, or N=2.

Using FFT, the above-described DCT matrix operation when N=8 is represented by

N=8

$$\begin{pmatrix} X0 \\ X2 \\ X4 \\ X6 \end{pmatrix} = \begin{pmatrix} 0.353553 & 0.353553 & 0.353553 & 0.353553 \\ 0.461940 & 0.191342 & -0.191342 & -0.461940 \\ 0.353553 & -0.353553 & -0.353553 & 0.353553 \\ 0.191342 & -0.461940 & 0.461940 & -0.191342 \end{pmatrix} \begin{pmatrix} x0+x7 \\ x1+x6 \\ x2+x5 \\ x3+x4 \end{pmatrix} \quad \text{formula (18)}$$

$$\begin{pmatrix} X1 \\ X3 \\ X5 \\ X7 \end{pmatrix} = \begin{pmatrix} 0.490393 & 0.415735 & 0.277785 & 0.097545 \\ 0.415735 & -0.097545 & -0.490393 & -0.277785 \\ 0.277785 & -0.490393 & 0.097545 & 0.415735 \\ 0.097545 & -0.277785 & 0.415735 & -0.490393 \end{pmatrix} \begin{pmatrix} x0-x7 \\ x1-x6 \\ x2-x5 \\ x3-x4 \end{pmatrix}$$

when $N = 4$

N=4

$$\begin{pmatrix} X0 \\ X2 \end{pmatrix} = \begin{pmatrix} 0.500000 & 0.500000 \\ 0.500000 & -0.500000 \end{pmatrix} \begin{pmatrix} x0+x3 \\ x1+x2 \end{pmatrix} \quad \text{formula (19)}$$

$$\begin{pmatrix} X1 \\ X3 \end{pmatrix} = \begin{pmatrix} 0.653281 & 0.270598 \\ 0.270598 & -0.653281 \end{pmatrix} \begin{pmatrix} x0-x3 \\ x1-x2 \end{pmatrix}$$

when $N = 2$

N=2

$$\begin{pmatrix} X0 \\ X1 \end{pmatrix} = (0.707107 \quad 0.707107) \begin{pmatrix} x0+x1 \\ x0-x1 \end{pmatrix} \quad \text{formula (20)}$$

On the other hand, the inverse DCT matrix operation when N=8 is represented by

\*\*N=8\*\*

$$\begin{pmatrix} x0 \\ x1 \\ x2 \\ x3 \end{pmatrix} = \begin{pmatrix} 0.353553 & 0.461940 & 0.353553 & 0.191342 \\ 0.353553 & 0.191342 & -0.353553 & -0.461940 \\ 0.353553 & -0.191342 & -0.353553 & 0.461940 \\ 0.353553 & -0.461940 & 0.353553 & -0.191342 \end{pmatrix} \begin{pmatrix} X0 \\ X2 \\ X4 \\ X6 \end{pmatrix} \begin{pmatrix} x7 \\ x1 \\ x2 \\ x3 \end{pmatrix} =$$

$$\begin{pmatrix} 0.353553 & 0.461940 & 0.353553 & 0.191342 \\ 0.353553 & 0.191342 & -0.353553 & -0.461940 \\ 0.353553 & -0.191342 & -0.353553 & 0.461940 \\ 0.353553 & -0.461940 & 0.353553 & 0.191342 \end{pmatrix} \begin{pmatrix} X0 \\ X2 \\ X4 \\ X6 \end{pmatrix} +$$

$$\begin{pmatrix} 0.490393 & 0.415735 & 0.277785 & 0.097545 \\ 0.415735 & -0.097545 & -0.490393 & -0.277785 \\ 0.277785 & -0.490393 & 0.097545 & 0.415735 \\ 0.097545 & -0.277785 & 0.415735 & -0.490393 \end{pmatrix} \begin{pmatrix} X1 \\ X3 \\ X5 \\ X7 \end{pmatrix} -$$

$$\begin{pmatrix} 0.490393 & 0.415735 & 0.277785 & 0.097545 \\ 0.415735 & -0.097545 & -0.490393 & -0.277785 \\ 0.277785 & -0.490393 & 0.097545 & 0.415735 \\ 0.097545 & -0.277785 & 0.415735 & -0.490393 \end{pmatrix} \begin{pmatrix} X1 \\ X3 \\ X5 \\ X7 \end{pmatrix}$$

when = 4 formula (21)

\*\*N=4\*\*

$$\begin{pmatrix} x0 \\ x1 \end{pmatrix} = \begin{pmatrix} 0.500000 & 0.500000 \\ 0.500000 & -0.500000 \end{pmatrix} \begin{pmatrix} X0 \\ X2 \end{pmatrix} + \begin{pmatrix} 0.653281 & 0.270598 \\ 0.270598 & -0.653281 \end{pmatrix} \begin{pmatrix} X1 \\ X3 \end{pmatrix}$$

$$\begin{pmatrix} x3 \\ x2 \end{pmatrix} = \begin{pmatrix} 0.500000 & 0.500000 \\ 0.500000 & -0.500000 \end{pmatrix} \begin{pmatrix} X0 \\ X2 \end{pmatrix} - \begin{pmatrix} 0.653281 & 0.270598 \\ 0.270598 & -0.653281 \end{pmatrix} \begin{pmatrix} X1 \\ X3 \end{pmatrix}$$

when $N = 2$ formula (22)

\*\*N=2\*\*

$(x0) = (0.707107)(X0) + (0.707107)(X1)$
$(x1) = (0.707107)(X0) - (0.707107)(X1)$ formula (23)

As can be seen from these formulae, the complexity of each matrix operation is significantly reduced by using FFT.

In this first embodiment, the use of so-called butterfly operation makes it possible to apply FFT to the matrix expression of DCT or inverse DCT, whereby DCT or inverse DCT operation is executed with less operational complexity.

Hereinafter, the structure of the DCT processor will be described.

FIG. 1 is a block diagram illustrating the structure of the DCT processor according to the first embodiment. In FIG. 1, the DCT processor 100 comprises a control circuit 101 which outputs a signal indicating the number N or M of pixel data constituting a unit block of N×M pixels; a bit slice circuit 102 which performs shift output, bit by bit, from the LSB of each 8-bit pixel data; a first butterfly operation circuit 103 which performs butterfly operation on the output from the bit slice circuit 102; a ROM address generation circuit 104 which generates ROM addresses on the basis of the output from the first butterfly operation circuit 103; a RAC 105 which reads ROM data corresponding to the ROM addresses and accumulates them; and a second butterfly operation circuit 106 which performs butterfly operation on the output from the RAC 105.

Further, the RAC 105 comprises ROM0, ROM1, ROM2, ROM3, ROM4, ROM5, ROM6, and ROM7 for performing DCT and inverse DCT operations; and accumulation circuits 51a, 51b, 51c, 51d, 51e, 51f, 51g, and 51h for accumulating the outputs from the respective ROMs. In this first embodiment, the ROM0~ROM7 are plural ROM areas in a single ROM.

This DCT processor employs the DA method for matrix operation, and the result of multiplication with respect to the bit strings obtained by taking the data, bit by bit, from the outputs of the first butterfly operation circuit according to the DCT matrix operation, the inverse DCT matrix operation, the DCT matrix operation using FFT, and the inverse DCT matrix operation using FFT, is stored as tables in the ROM0~ROM7. By inputting the bit strings obtained from the outputs of the first butterfly operation circuit 103 as addresses to the respective ROMs, the result of multiplication is output from each ROM, and this result of multiplication is sequentially output from the LSB to the MSB of each pixel data to be accumulated by the accumulation circuits 51a~51h, thereby obtaining the result of matrix operation.

The ROM0~ROM7 contain, as the result of multiplication in the case where the number N or M of pixel data is a power of 2, the result of multiplication with respect to the bit strings obtained from the outputs of the first butterfly operation circuit 103 according to the DCT and inverse DCT matrix operations using FFT. Further, these ROMs contain, as the result of multiplication in the case where the number N or M is not a power of 2, the result of multiplication with respect to the bit strings obtained from the outputs of the first butterfly operation circuit 103 according to the normal DCT and inverse DCT matrix operations using no FFT.

To be specific, the partial products calculated between the bit strings obtained from the bit-unit outputs of the first butterfly operation circuit 103 and the coefficients of the matrix operations represented by formulae (5)~(7), (9), (12)~(14), (16), (18)~(23) are stored as tables in the ROM0~ROM7.

Since the value of N or M indicating the number of input pixel data is variable, the number of the sets of ROMs and accumulators is eight that is the maximum value of N or M. Further, in this first embodiment, since the value of N or M is variable and the coefficients used for the DCT and inverse DCT operations are also variable, the partial products according to the case where the value of N or M varies are separately stored in the ROM0~ROM7.

Figure 2:
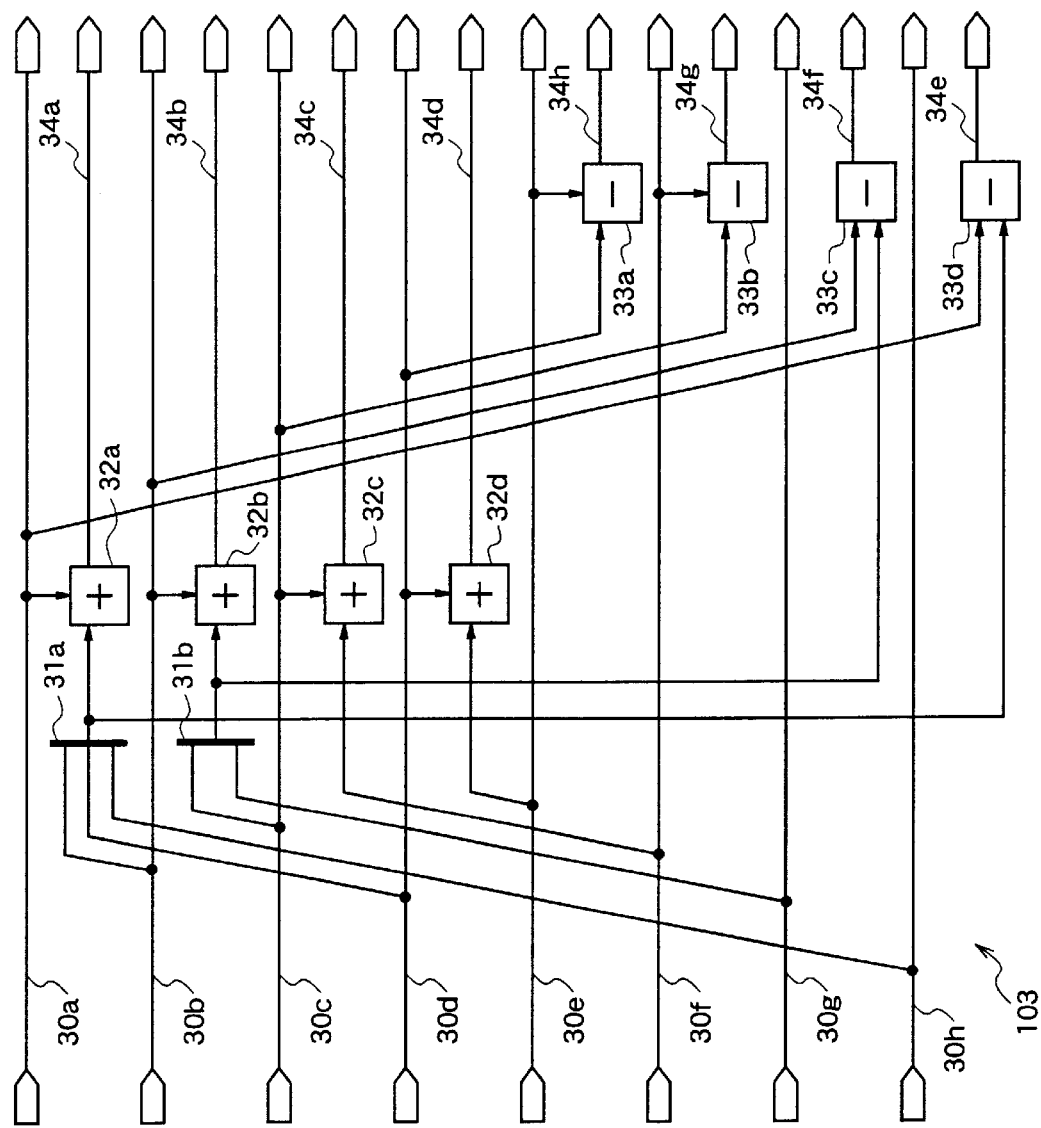
FIG. 2 is a diagram illustrating the internal structure of a first butterfly operation circuit according to the first embodiment of the present invention.

FIG. 2 is a block diagram illustrating an example of the internal structure of the first butterfly operation circuit 103. This first-butterfly operation circuit 103 performs butterfly operation when a control signal conducts the DCT operation and N or M indicating the number of pixel data is a power of 2, i.e., 2, 4, or 8. In the cases other than mentioned above, the circuit 103 outputs the data without performing butterfly operation. The first butterfly operation circuit 103 comprises data lines 30a, 30b, 30c, 30d, 30e, 30f, 30g, and 30h which receive the bit signals of the respective pixel data outputted from the bit slice circuit 102; a first selection circuit 31a which selects the data line 30h when the control signal indicates that N or M is 8, selects the data line 30d when the control signal indicates that N or M is 4, and selects the data line 30d when the control signal indicates that N or M is 2; a second selection circuit 31b which selects the data line 30g when the control signal indicates that N or M is 8, and selects the data line 30c when the control signal indicates that N or M is 4; a first addition circuit 32a which adds the data supplied from the data line 30a and the first selection circuit 31a; a second addition circuit 32b which adds the data supplied from the data line 30b and the second selection circuit 31b; a third addition circuit 32c which adds the data supplied from the data line 30c and the data line 30d; a fourth addition circuit 32d which adds the data supplied from the data line 30d and the data line 30e; a first subtraction circuit 33a which performs subtraction of the signals supplied from the data line 30d and the data line 30e; a second subtraction circuit 33b which performs subtraction on the data supplied from the data line 30c and the data line 30f; a third subtraction circuit 33b which performs subtraction on the data supplied from the data line 30b and the second selection circuit 31b; and a fourth subtraction circuit 33d which performs subtraction on the data supplied from the data line 30a and the first selection circuit 31a. This first butterfly operation circuit 104 performs the butterfly operation as follows. That is, the pixel data, which have been input to the bit slice circuit 102 for each row or column and then sliced bit by bit to be output, are sequentially added or subtracted to/from each other starting from the both ends of the input column or row toward the inside, and thus obtained values are output.

Figure 3:
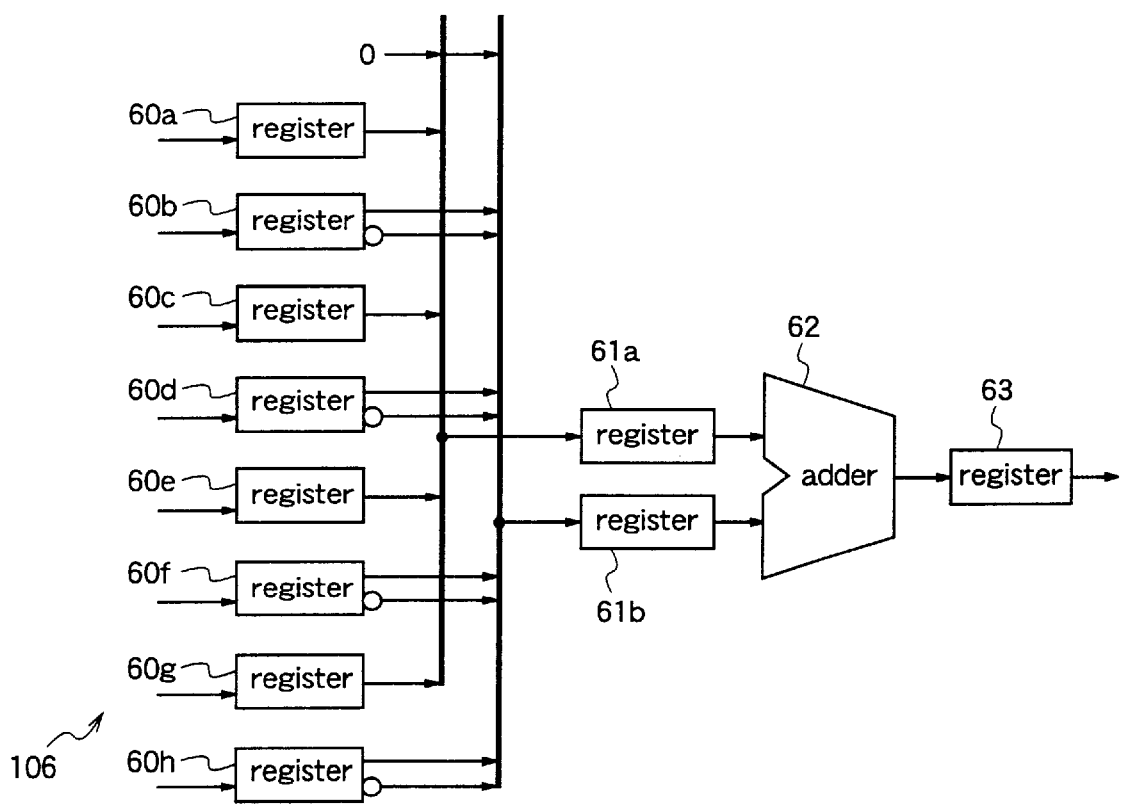
FIG. 3 is a diagram illustrating the internal structure of a second butterfly operation circuit according to the first embodiment of the present invention.

FIG. 3 is a block diagram illustrating an example of the internal structure of the second butterfly operation circuit 106. This second butterfly operation circuit 106 performs butterfly operation when a control signal conducts the inverse DCT operation and N or M indicating the number of pixel data is a power of 2, i.e., 2, 4, or 8. In the cases other than mentioned above, it outputs the data without performing butterfly operation. The second butterfly operation circuit 106 comprises registers 60a, 60b, 60c, 60d, 60e, 60f, 60g, and 60h which latch the outputs from the accumulation circuits 51a, 51b, 51c, 51d, 51e, 51f, 51g, and 51h included in the RAC 105, respectively; a register 61a which latches the outputs from the registers 60a, 60c, 60e, and 60g; a register 61b which latches the outputs from the registers 60b, 60d, 60f, and 60h; an adder 62 which adds the data supplied from the register 61a and the register 61b; and a register 63 which latches the output of the adder 62. This second butterfly operation circuit 106 performs the butterfly operation as follows. That is, the result of arithmetic operation performed between the odd-numbered pixel data, amongst the pixel data which have been output from the RAC 105 and input for each row or column, and the matrix coefficients obtained by FFT is added to or subtracted from the result of arithmetic performed between the even-numbered pixel data and the matrix coefficients obtained by FFT, and thus obtained values are output.

Next, the ROM addresses generated by the ROM address generation circuit 104 will be described. This ROM address generation circuit 104 generates ROM addresses by adding header addresses to the bit strings constituted by the outputs of the first butterfly operation circuit 103, and all of the addresses obtained by adding these header addresses become continuous addresses. These header addresses are determined on the basis of the value of N or M and the value indicating that either the DCT operation or the inverse DCT operation is to be performed, which values are indicated by the control signal outputted from the control circuit 101.

As shown in FIG. 4, in the DCT operation where the value of N or M is 7, a 7-bit signal based on signals A6, A5, A4, A3, A2, A1, and A0 which are output from the data lines 30g, 30f, 30e, 30d, 30c, 30b, and 30a of the first butterfly operation circuit 103, respectively, is given 0 as its upper bit A7 and, further, an 8-bit signal based on these signals A7, A6, A5, A4, A3, A2, A1, and A0 is given 0 as a value indicating that the DCT operation is to be performed, and thus generated 9-bit signal is used as a ROM address.

Likewise, in the DCT operation where the value of N or M is 6, a 6-bit signal based on the signals A5, A4, A3, A2, A1 and A0 which are output from the data lines 30f, 30e, 30d, 30c, 30b and 30a of the first butterfly operation circuit 103 is given 1 and 0 as its upper bits A7 and A6. When the value of N or M is 5, a 5-bit signal based on the signals A4, A3, A2, A1 and A0 which are output from the data-lines 30e, 30d, 30c, 30b and 30a of the first butterfly operation circuit 103 is given 1, 1, and 0 as its upper bits A7, A6, and A5. When the value of N or M is 8, a 4-bit signal based on the signals A3, A2, A1, and A0 which are output from the data lines 34a, 34b, 34c and 34d or the data lines 34e, 34f, 34g and 34h of the first butterfly operation circuit 103 is given 1, 1, 1, and 0 as its upper bits A7, A6, A5, and A4. When the value of N or M is 3, a 3-bit signal based on the signals A2, A1, and A0 which are output from the data lines 30c, 30b, and 30a of the first butterfly operation circuit 103 is given 1, 1, 1, 1, and 0 as its upper bits A7, A6, A5, A4, and A3. When the value of N or M is 4, a 2-bit signal based on the signals A1 and A0 which are output from the data lines 34a and 34b or the data lines 34e and 34f of the first butterfly operation circuit 103 is given 1, 1, 1, 1, 1, and 0 as its upper bits A7, A6, A5, A4, A3, and A2. When the value of N or M is 2, a 1-bit signal based on the signal A0 which is output from the data line 34a or the data line 34e of the first butterfly operation circuit 103 is given 1, 1, 1, 1, 1, 1, and 0 as its upper bits A7, A6, A5, A4, A3, A2, and A1. Further, each of the 8-bit signals comprising A7, A6, A5, A4, A3, A2, A1, and A0 is given 0 indicating the DCT operation, and thus generated 9-bit signal is used as a ROM address.

In the case of the inverse DCT operation, an 8-bit signal comprising A7, A6, A5, A4, A3, A2, A1, and A0 is given 1 as its MSB to generate a ROM address.

That is, in the inverse DCT operation where the value of N or M is 7, a 7-bit signal based on the signals A6, A5, A4, A3, A2, A1, and A0 which are output from the data lines 30g, 30f, 30e, 30d, 30c, 30b, and 30a of the first butterfly operation circuit 103 is given 0 as its upper bit A7 and, further, an 8-bit signal comprising the signals A7, A6, A5, A4, A3, A2, A1, and A0 is given 1 indicating the inverse DCT operation, and thus generated 9-bit signal is used as a ROM address.

Likewise, in the inverse DCT operation where the value of N or M is 6, a 6-bit signal based on the signals A5, A4, A3, A2, A1, and A0 which are output from the data lines 30f, 30e, 30d, 30c, 30b, and 30a of the first butterfly operation circuit 103 is given 1 and 0 as its upper bits A7 and A6. When the value of N or M is 5, a 5-bit signal based on the signals A4, A3, A2, A1, and A0 which are output from the data lines 30e, 30d, 30c, 30b, and 30a of the first butterfly operation circuit 103 is given 1, 1, 0 as its upper bits A7, A6, A5. When the value of N or M is 8, a 4-bit signal based on the signals A3, A2, A1, and A0 which are output from the data lines 30g, 30e, 30c, and 30a or the data lines 30h, 30f, 30d, and 30b of the first butterfly operation circuit 103 is given 1, 1, 1, 0 as its upper bits A7, A6, A5, A4. When the value of N or M is 3, a 3-bit signal constituted by the signals A2, A1, and A0 which are output from the data lines 30c, 30b, and 30a of the first butterfly operation circuit 103 is given 1, 1, 1, 1, 0 as its upper bits A7, A6, A5, A4, A3. When the value of N or M is 4, a 2-bit signal constituted by the signals A1 and A0 which are output from the data lines 30c and 30a or the data lines 30d and 30b of the first butterfly operation circuit 103 is given 1, 1, 1, 1, 1, 0 as its upper bits A7, A6, A5, A4, A3, A2. When the value of N or M is 2, a 1-bit signal constituted by the signal A0 which is output from the data line 30a or 30b of the first butterfly operation circuit 103 is given 1, 1, 1, 1, 1, 1, 0 as its upper bits A7, A6, A5, A4, A3, A2, A1. Further, each of the 8-bit signals comprising A7, A6, A5, A4, A3, A2, A1, and A0 is given 1 indicating the inverse DCT operation, and thus generated 9-bit signal is used as a ROM address.

In the ROM address generation circuit 104, the number of address data possessed by each ROM in the RAC 105 can be reduced to 512 by the above-described address generation. However, it includes data sections of four unused addresses shown in FIG. 4.

Figure 5:
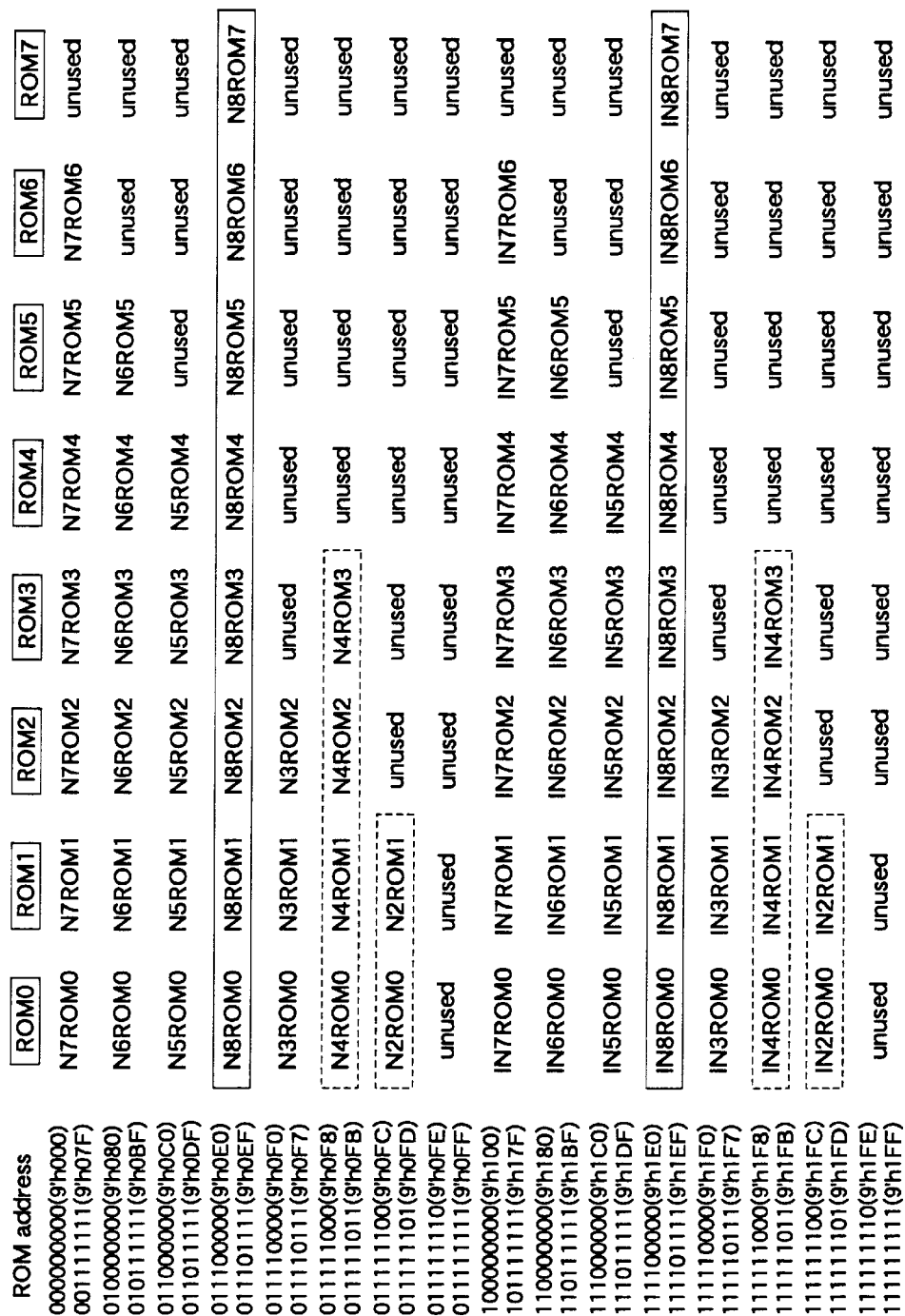
FIG. 5 is a map of data capacities used by ROMs according to the first embodiment of the present invention.

FIG. 5 is a map of ROM data recorded in the respective ROMs of the RAC 105. The results of multiplication for performing the DCT or inverse DCT operation in the case where N or M is 1~8 are respectively recorded in the ROM0, ROM1, ROM2, ROM3, ROM4, ROM5, ROM6, and ROM7 in association with the ROM addresses.

Hereinafter, the operation of the DCT processor 100 will be described.

The operation will be described on the assumption that the DCT processor 100 receives 8×7 pixel data and performs the DCT operation.

Initially, the control circuit 101 outputs a signal indicating the number N or M of input pixel data, and either the DCT operation or the inverse DCT operation. In this case, the control signal indicates N=8, M=7, and DCT operation. Next, the bit slice circuit 102 outputs the eight pieces of pixel data in the column direction, bit by bit, from the LSB of each pixel data. The first butterfly operation circuit 103 receives the signal indicating N=8, and performs the butterfly operation represented by formula (18). That is, the first selection circuit 31a selects the data line 30h, and the second selection circuit 31b selects the data line 30g. The first addition circuit 32a adds the signal supplied from the data line 30h selected by the first selection circuit 31a, and the signal supplied from the data line 30a. Further, the second addition circuit 32b adds the signal supplied from the data line 30g selected by the second selection circuit 31b, and the signal supplied from the data line 30b. Further, the third addition circuit 32c adds the data supplied from the data line 30c and the data line 30d, and the fourth addition circuit 32d adds the data supplied from the data line 30d and the data line 30e.

On the other hand, the first subtraction circuit 33a performs subtraction on the signals supplied from the data line 30d and the data line 30e, and the second subtraction circuit 33b performs subtraction on the data supplied from the data line 30c and the data line 30f. Further, the third subtraction circuit 33b performs subtraction on the data supplied from the data line 30g selected by the second selection circuit 31b and the data supplied from the data line 30b, and the fourth subtraction circuit 33d performs subtraction on the data supplied from the data line 30h selected by the first selection circuit 31a and the data supplied from the data line 30a.

In this way, the first butterfly operation circuit 103 performs the butterfly operation. This operation is equivalent to additions and subtractions on the right side of formula (18), namely, x0+x7, x1+x6, x2+x5, x3+x4, x0−x7, x1−x6, x2−x5, and x3−x4.

The ROM address generation circuit 104 generates a ROM address signal on the basis of the output from the first butterfly operation circuit 103, and outputs the signal. That is, the ROM address generation circuit 104 adds 01110, as upper five bits, to a 4-bit signal constituted by signals indicating x0+x7, x1+x6, x2+x5, x3+x4 in this order, thereby generating a 9-bit ROM address. This ROM address is output to the ROM0, ROM2, ROM4, and ROM6 of the RAC 105. Further, the ROM address generation circuit 104 adds 01110, as upper five bits, to a 4-bit signal constituted by signals indicating x0−x7, x1−x6, x2−x5, and x3−x4 in this order, thereby generating a 9-bit ROM address. This ROM address is output to the ROM1, ROM3, ROM5, and ROM7 of the RAC 105.

The ROM0, ROM1, ROM2, ROM3, ROM4, ROM5, ROM6, and ROM7 in the RAC 105 output the data corresponding to the ROM addresses generated by the ROM address generation circuit 104, and the accumulation circuits 51a, 51c, 51c, 51d, 51e, 51f, 51g, and 51h accumulate the outputs from the respective ROMs and output the results. Thereby, X0, X2, X4, X6, X1, X3, X5, and X7 shown in formula (18) are calculated.

The second butterfly operation circuit 106 outputs the data supplied from the accumulation circuits 51a, 51b, 51c, 51d, 51e, 51f, 51g, and 51h of the RAC 105, as DCT-processed eight pieces of pixel data. To be specific, the registers 60a, 60b, 60c, 60d, 60e, 60f, 60g, and 60h of the second butterfly operation circuit 106 latch the output signals from the accumulation circuits 51a, 51b, 51c, 51d, 51e, 51f, 51g, and 51h, respectively, and output these signals in the order as inputted.

Figure 6:
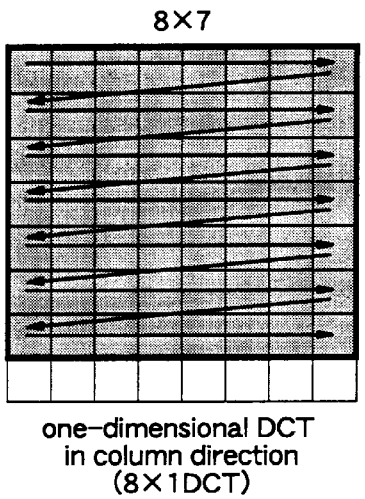
FIGS. 6(a)–6(d) are a schematic diagram for explaining DCT for a block of 8×7 pixels according to the first embodiment of the present invention.
Figure 6:
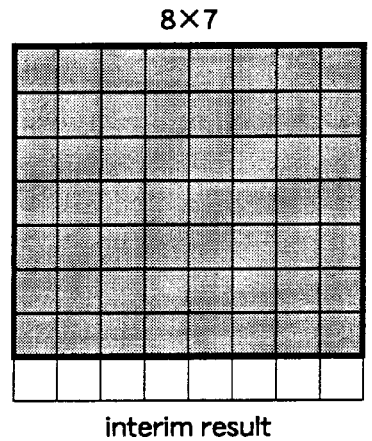
Figure 6:
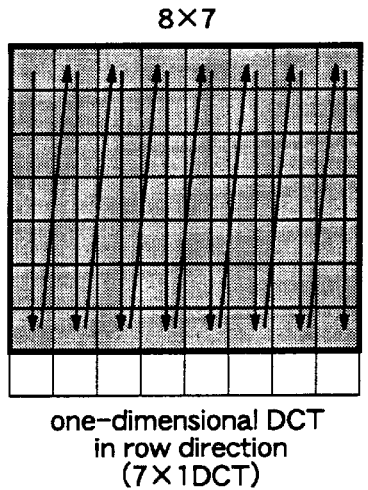
Figure 6:
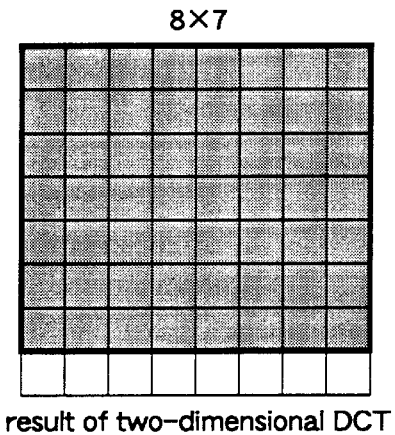

In this way, a series of operations described above are repeated seven times for every 8 pieces of pixel data which are input along the column direction (FIG. 6(a)), whereby the interim results for 56 pieces of pixel data are output to end the one-dimensional DCT operation (FIG. 6(b)).

Next, the 56 pieces of interim results (FIG. 6(b)) are input to the DCT processor 100, for every seven pieces of pixel data along the row direction. In this case, the operation represented by formula (5) is executed. In like manner as described above, a series of operations described above are repeated eight times for every 7 pieces of pixel data (FIG. 6(c)), thereby completing the two-dimensional DCT operation for the 56 pieces of pixel data (FIG. 6(d)).

In this case, since the eighth pixel data does not exist, the bit slice circuit 102 performs bit slicing on the seven pieces of input pixel data, and the ROM7 and the accumulation circuit 51h in the RAC 105 do not operate.

Next, a description will be given of the case where the DCT processor 100 receives 6×4 pixel data, and performs the inverse DCT operation.

Initially, the control circuit 101 outputs a signal indicating the number N or M of input pixel data, and either the DCT operation or the inverse DCT operation. In this case, the control signal indicates N=6, M=4, and inverse DCT operation. Next, the bit slice circuit 102 outputs the input six pieces of pixel data in the column direction, bit by bit, from the LSB of each pixel data. The first butterfly operation circuit 103 receives the signal indicating N=6 and inverse DCT, and outputs the input pixel data as it is without performing butterfly operation.

The ROM address generation circuit 104 generates a ROM address signal on the basis of the output from the first butterfly operation circuit 103, and outputs the signal.

When N=6, the ROM address generation circuit 104 adds 110, as upper three bits, to a 6-bit signal constituted by the signals A5, A4, A3, A2, A2, and A0 in this order, thereby generating a 9-bit ROM address. This ROM address is output to the ROM0, ROM1, ROM2, ROM3, ROM4, and ROM5 in the RAC 105.

The ROM1, ROM2, ROM3, ROM4, and ROM5 in the RAC 105 output the data corresponding to the ROM address generated by the ROM address generation circuit 104, and the accumulation circuits 51a, 51b, 51c, 51d, 51e, and 51f accumulate the outputs from the respective ROMs and output the results. Thereby, X0, X1, X2, X3, X4, and X5 shown in formula (13) are calculated.

In the RAC 105, the ROM6, the ROM7, and the accumulation circuits 51g and 51h do not operate because there are no corresponding input pixel data.

The second butterfly operation circuit receives the control signal indicating N=6 and inverse DCT operation, and outputs the data supplied from the accumulation circuits 51a, 51b, 51c, 51d, 51e, and 51f, as inverse-DCT-processed six pieces of pixel data. That is, the registers 60a, 60b, 60c, 60d, 60e, and 60f of the second butterfly operation circuit 106 latch the output signals from the accumulation circuits 51a, 51b, 51c, 51d, 51e, and 51f of the RAC 105, and output these signals in the order as inputted.

Figure 7:
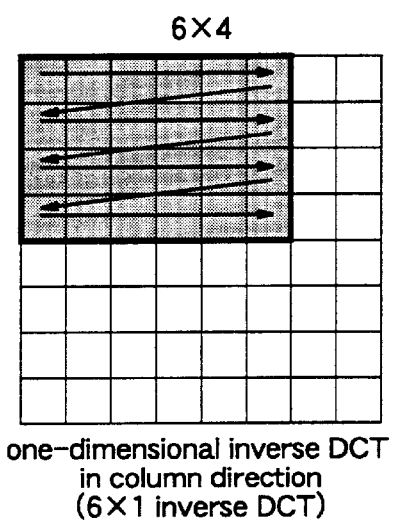
FIGS. 7(a)–7(d) are a schematic diagram for explaining inverse DCT for a block of 6×4 pixels according to the first embodiment of the present invention.
Figure 7:
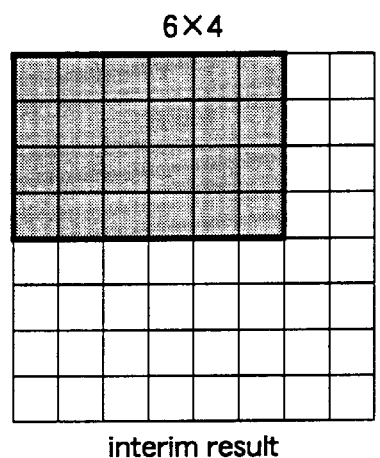
Figure 7:
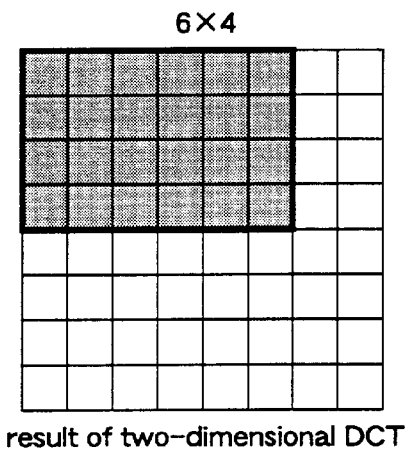
Figure 7:
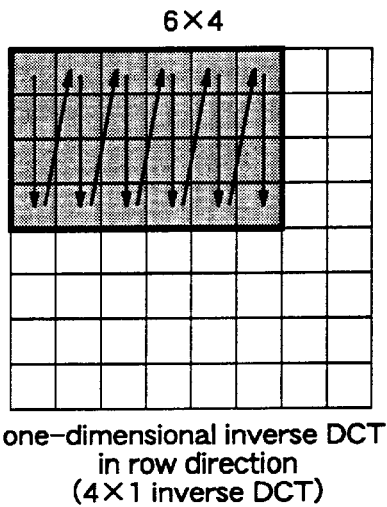
Figure 8:
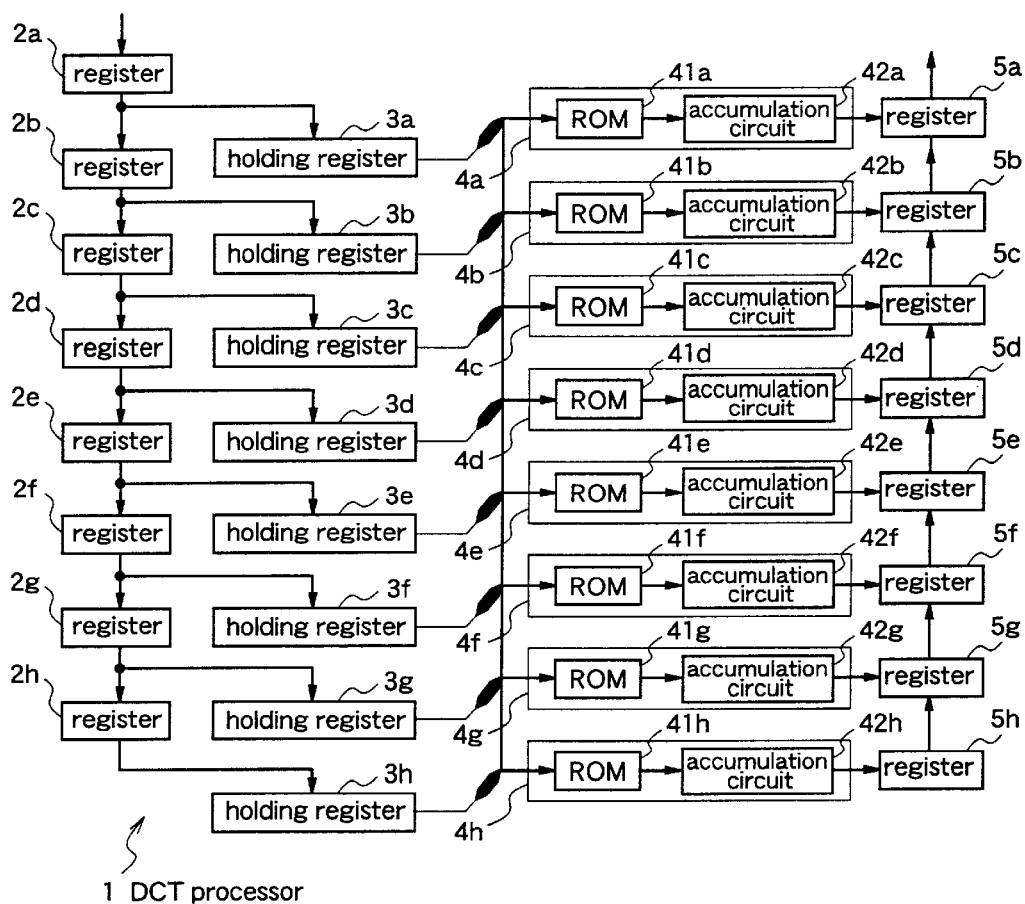
FIG. 8 is a block diagram illustrating the structure of a conventional DCT processor.

In this way, a series of operations described above are repeated four times for every six pieces of pixel data which are input along the column direction (FIG. 7(a)), whereby the interim results for 24 pieces of pixel data are output to end the one-dimensional inverse DCT operation (FIG. 7(b)).

Next, the 24 pieces of interim results (FIG. 7(b)) are input to the DCT processor 100 for every four pieces of pixel data along the row direction. In like manner as described above, a series of operations described above are repeated six times for every four pieces of pixel data (FIG. 7(c)), thereby completing the two-dimensional inverse DCT operation for the 24 pieces of pixel data (FIG. 7(d)).

More specifically, the control circuit 101 outputs a signal indicating M=4 and inverse DCT operation. Next, the bit slice circuit 102 outputs the input four pieces of pixel data along the row direction, bit by bit, starting from the LSB of each pixel data. The first butterfly operation circuit 103 receives the signal indicating M=4 and inverse DCT operation, and outputs the bit-by-bit-sliced input pixel data as it is without performing butterfly operation.

The ROM address generation circuit 104 generates a ROM address signal on the basis of the output from the first butterfly operation circuit 103, and outputs it. That is, 0111110 is added, as upper seven bits, to a 2-bit signal which is output from the data lines 30c and 30a or the data lines 30d and 30b, thereby generating a 9-bit ROM address. This ROM address is output to the ROM0 and ROM2 or the ROM1 and ROM3 of the RAC 105.

The ROM0, ROM1, ROM2, and ROM3 in the RAC 105 output the data corresponding to the ROM address generated by the ROM address generation circuit 104, and the accumulation circuits 51a, 51b, 51c, and 51d accumulate the outputs from the respective ROMs, and output the results.

The second butterfly operation circuit receives the control signal indicating M=4 and inverse DCT operation, performs butterfly operation on the outputs from the accumulation circuits 51a 51b, 51c, and 51d in the RAC 105, and outputs the results. That is, the outputs from the accumulation circuits 51a, 51b, 51c, and 51d in the RAC 105 are latched by the registers 60a, 60b, 60c, and 60d. The register 61a performs data latch four times in the following order: the output of the register 61a, the output of the register 60c, the output of the register 60a, and the output of the register 60c. On the other hand, the register 61b performs data latch four times in the following order: the output of the register 60b, the output of the register 60d, the inverse output of the register 60b, and the inverse output of the register 60d. The adder 62 sequentially adds the output from the register 61a and the output from the register 61b. Thereby, x0, x1, x2, and x3 shown in formula (22) are calculated. The register 63 sequentially latches the outputs from the adder 62, and outputs them.

As described above, according to the DCT processor of the first embodiment, the butterfly operations performed by the first butterfly operation circuit 103 and the second butterfly operation circuit 106 are controlled by the control signal which indicates the value of N or M and either DCT operation or inverse DCT operation, and the ROM address generation circuit 104 generates the ROM addresses corresponding to the DCT operation or the inverse DCT operation for the pixel data in N or M unit blocks, whereby both of the DCT operation and the inverse DCT operation for the pixel data in N×M unit blocks (N,M: arbitrary integers from 1 to 8) can be performed by a single DCT processor. Thereby, the circuit scale of the DCT processor is reduced.

Further, the DCT processor is provided with the first butterfly operation circuit 103 and the second butterfly operation circuit 106, and utilizes the butterfly operation when the value of N or M is a power of 2. Therefore, the operational complexity can be reduced by utilizing FFT for the matrix operation, and the quantity of data as the result of multiplication used for obtaining the result of DCT operation and the result of inverse DCT operation (i.e., the quantity of partial products obtained by multiplying the bit strings of N or M bits constituted by the respective bits of the input pixel data of N or M pixels by the coefficients used for obtaining the result of DCT operation and the result of inverse DCT operation) can be reduced, whereby the data capacities of the ROMs for storing this data can be reduced, resulting in a DCT processor of reduced circuit scale.

Further, although the quantity of data to be stored in the ROM0~ROM7 can be reduced by using FFT, when the ROM0~ROM7 are implemented as plural regions in a single ROM, the reduced data sections should be put close to reduce the capacity of the entire ROM. However, when the data, the number of which is reduced by FFT, is stored in the ROM by putting the reduced data sections close as they are, it becomes impossible to use the respective bits of the input data as an address, which is one of the features of the DA method. In this case, means for rearranging the bit strings obtained from the respective bits of the input pixel data is needed, resulting in complicated address generation. In contract with this, according to the first embodiment, when the ROM address generation circuit 104 generates ROM addresses by adding header addresses to the bit strings obtained from the first butterfly operation circuit 103, the circuit 104 employs, as the header addresses, bit strings by which all of the generated addresses become continuous addresses. Thereby, the data can be mapped in the ROM with efficiency such that the bit strings from the first butterfly operation circuit 103 can be used as parts of the addresses and no useless area is generated in the ROM, whereby the capacity of the ROM can be reduced. As the result, the circuit scale of the DCT processor is further reduced.

Embodiment 2.

Figure 10:
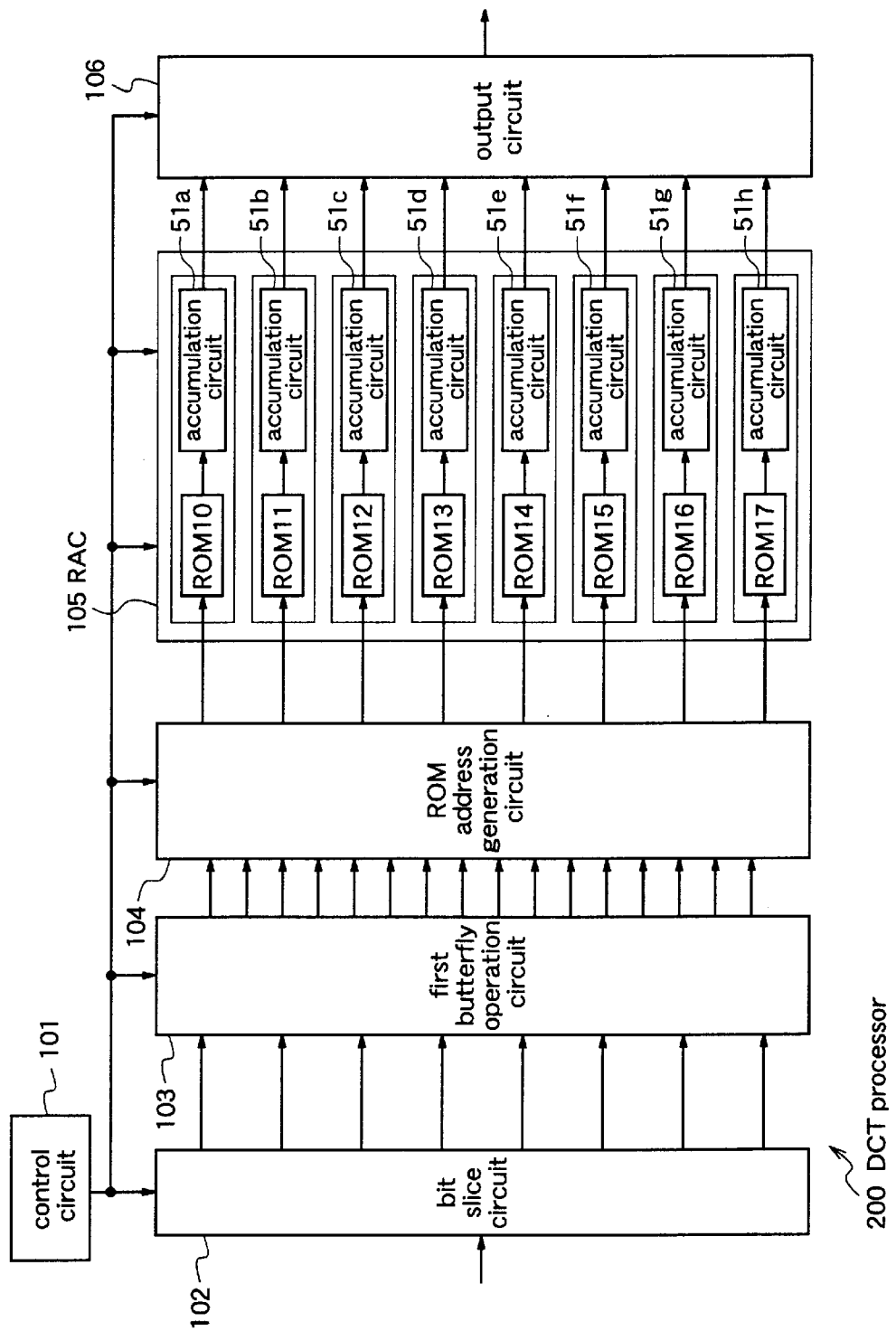
FIG. 10 is a block diagram illustrating the structure of a DCT processor according to the fourth embodiment of the present invention.

FIG. 10 illustrates a DCT processor according to a second embodiment of the present invention, and in the figure the same reference numerals as those shown in FIG. 1 designate the same or corresponding parts. A DCT processor 200 according to this second embodiment is identical to the DCT processor 100 of the first embodiment except that an output circuit 206 which outputs the data from the operation means according to the order of the input pixel data is provided instead of the second butterfly operation circuit, and only the DCT operation is performed. In the DCT processor 200, since the control signal outputted from the control circuit 101 does not include the value indicating that either the DCT operation or the inverse DCT operation is to be performed, it is not necessary to include the value indicating either the DCT operation or the inverse DCT operation in the ROM address generated by the ROM address generation circuit 104 and, therefore, the ROM address is an 8-bit address obtained by adding a header address indicating the value of N or M to the bit-by-bit-sliced input pixel data. Further, ROM10~ROM17 are obtained by removing the areas for storing the data used for the inverse DCT operation, from the ROM0~ROM7. The operation of this DCT processor 200 is identical to the operation for DCT of the DCT processor according to the first embodiment and, therefore, does not require repeated description.

Also in this second embodiment, as in the first embodiment, the butterfly operation performed by the first butterfly operation circuit 103 is controlled by the control signal indicating the value of N or M, and the ROM address generation circuit 104 generates the ROM address corresponding to the DCT operation for the pixel data in N or M unit blocks, on the basis of the output from the first butterfly operation circuit 103. Thereby, the DCT operation for the pixel data in N×M unit blocks having the number of rows or columns being an arbitrary integer from 1 to 8 is performed by a single DCT processor, resulting in a DCT processor having reduced circuit scale.

Further, since the butterfly operation is used when the value of N or M is a power of 2, the operational complexity can be reduced by utilizing FFT for the matrix operation, whereby the data capacity of the ROM for storing the data to be the result of multiplication which is used for obtaining the result of DCT operation can be reduced, resulting in a DCT processor having reduced circuit scale.

Further, the data can be mapped in the ROM with efficiency such that the bit strings obtained from the first butterfly operation circuit 103 can be used as parts of addresses and no useless area is generated in the ROM, whereby the capacity of the ROM is reduced, resulting in further reduction in the circuit scale of the DCT processor.

Embodiment 3.

Figure 11:
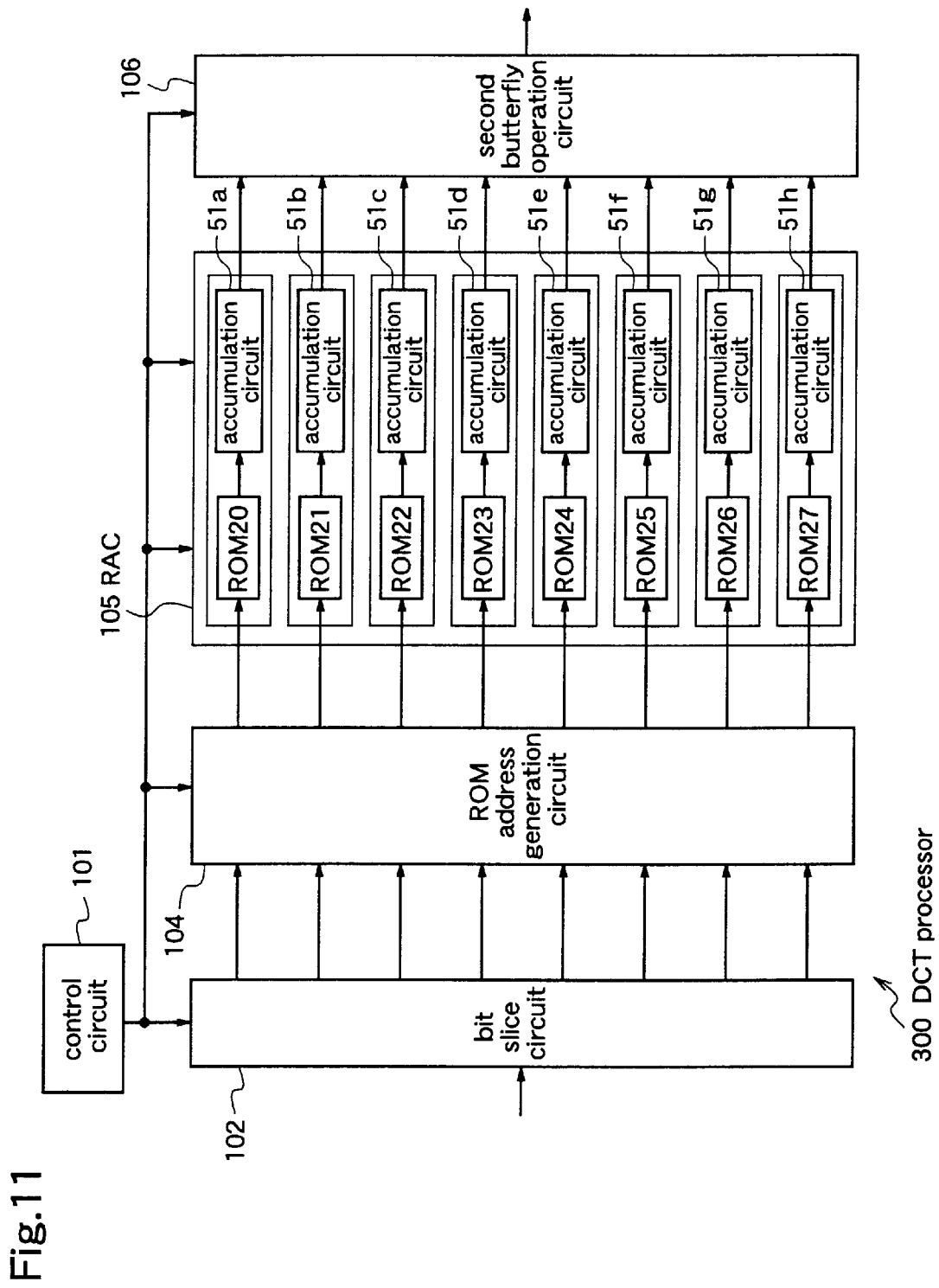
FIG. 11 is a block diagram illustrating the structure of a DCT processor according to the fourth embodiment of the present invention.

FIG. 11 illustrates a DCT processor according to a third embodiment of the present invention, and in the figure the same reference numerals as those shown in FIG. 1 designate the same or corresponding parts. A DCT processor 300 according to this third embodiment is identical to the DCT processor 100 of the first embodiment except that no first butterfly operation circuit is provided, and the output from the bit slice means 102 is directly input to the ROM address generation circuit 104, and only the inverse DCT operation is performed. In the DCT processor 300, since the control signal outputted from the control circuit 101 does not include the value indicating that either the DCT operation or the inverse DCT operation is to be performed, it is not necessary to include the value indicating either the DCT operation or the inverse DCT operation in the ROM address generated by the ROM address generation circuit 104 and, therefore, the ROM address is an 8-bit address obtained by adding a header address indicating the value of N or M to the bit-by-bit-sliced input pixel data. Further, ROM20~ROM27 are obtained by removing the areas for storing the data used for the DCT operation, from the ROM0~ROM7. The operation of this DCT processor 300 is identical to the operation for inverse DCT of the DCT processor according to the first embodiment and, therefore, does not require repeated description.

Also in this third embodiment, as in the first embodiment, the butterfly operation performed by the second butterfly operation circuit 106 is controlled by the control signal indicating the value of N or M, and the ROM address generation circuit 104 generates the ROM address corresponding to the inverse DCT operation for the pixel data in N or M unit blocks, from the output of the bit slice circuit 102. Thereby, the inverse DCT operation for the pixel data in N×M unit blocks having the number of rows or columns being an arbitrary integer from 1 to 8 is performed by a single DCT processor, resulting in a DCT processor having reduced circuit scale.

Further, since the butterfly operation is used when the value of N or M is a power of 2, the operational complexity can be reduced by utilizing FFT for the matrix operation, whereby the data capacity of the ROM for storing the data to be the result of multiplication which is used for obtaining the result of inverse DCT operation can be reduced, resulting in a DCT processor having reduced circuit scale.

Further, the data can be mapped in the ROM with efficiency such that the bit strings obtained from the first butterfly operation circuit 103 can be used as parts of addresses and no useless area is generated in the ROM, whereby the capacity of the ROM is reduced, resulting in further reduction in the circuit scale of the DCT processor.

Embodiment 4.

Figure 9:
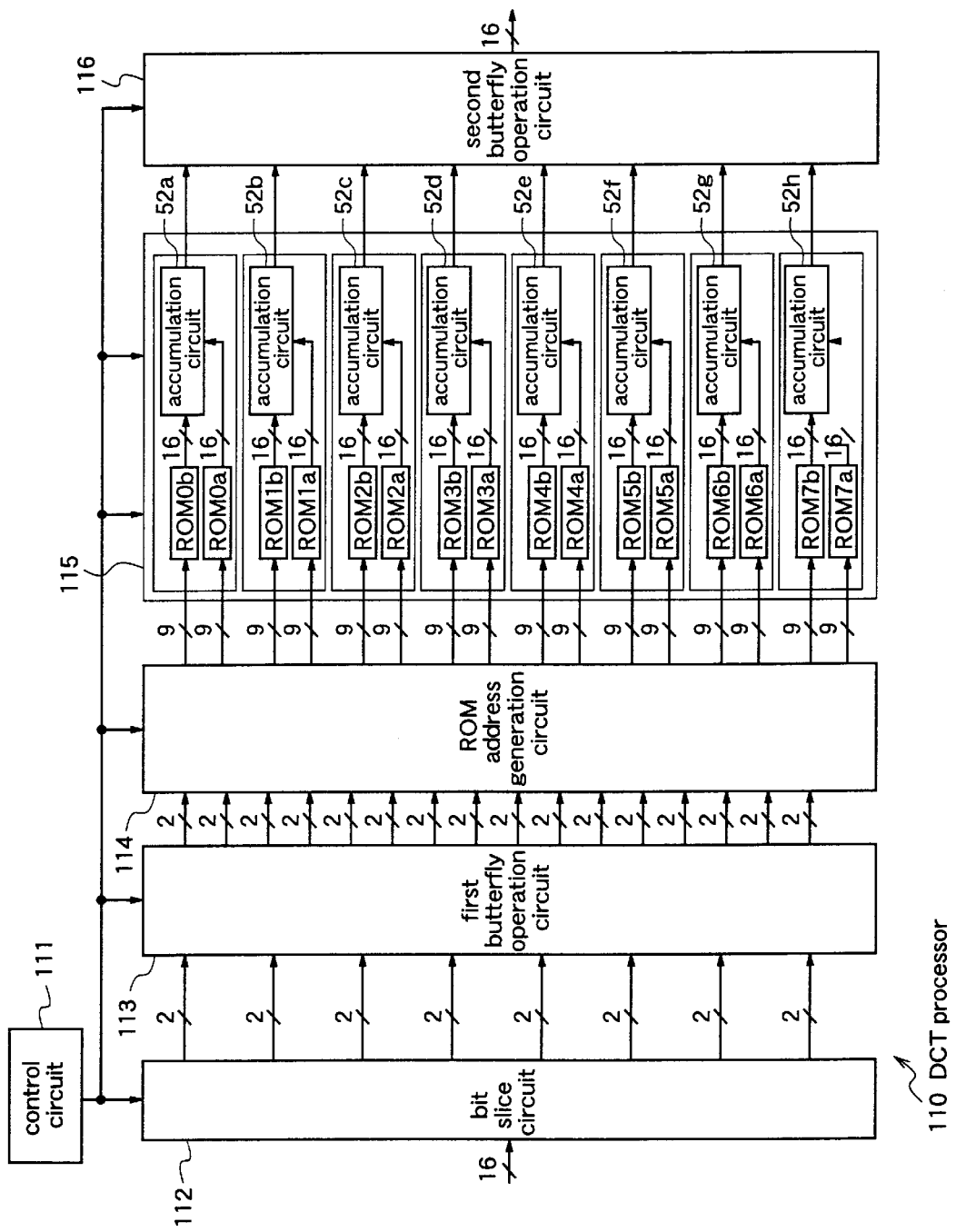
FIG. 9 is a block diagram illustrating the structure of a DCT processor according to a fourth embodiment of the present invention.

FIG. 9 is a block diagram illustrating the structure of a DCT processor according to a fourth embodiment of the present invention. In the figure, a bit slice circuit 112 is identical to the bit slice circuit 102 of the first embodiment except that it receives 16-bit pixel data, and slices the pixel data for every 2 bits as a unit. Further, a first butterfly operation circuit 113 is identical to the first butterfly operation circuit 103 of the first embodiment except that it performs butterfly operation for every two-bit data and outputs the data in units of two bits. A ROM address generation circuit 114 generates 9-bit addresses by adding header addresses to the addresses represented by the respective bits of the 2-bit data outputted from the first butterfly operation circuit 113. These header addresses are the same as the data used by the ROM address generation circuit 104 of the first embodiment, that is, bit strings such that all of the addresses obtained by adding them to the output of the first butterfly operation circuit 113 are rearranged to continuous addresses. A RAC 115 comprises, like the RAC 105 of the first embodiment, a plurality of.ROMs which hold, as tables, the partial products obtained by multiplying the bit strings obtained from the bit-unit outputs of the first butterfly operation circuit 113 by the coefficients of the matrix operations represented by formulae (5)~(7), (9), (12)~(14), (16), and (18)~(23); and a plurality of accumulation circuits which accumulate the data outputted from the respective ROMs according to the addresses outputted from the ROM address generation circuit 114. However, since the bit slice circuit 112 slices the pixel data in units of two bits, each ROM requires two tables for separately holding the partial products corresponding to the two addresses obtained from the two bits. Therefore, in place of the ROM0~ROM7 of the RAC 105 of the first embodiment, the RAC 115 comprises ROM0a~ROM7a and ROM0b~ROM7b of the same structure as the ROM0~ROM7, respectively, and the corresponding ROMa and ROMb are arranged in parallel with each other. Although in this fourth embodiment the data in each of the ROM0a~ROM7a and the ROM0b~ROM7b is 16-bit data, the number of bits of this data is not restricted thereto. The accumulation circuits 52a~52h receive, as 16-bit data, the outputs from ROM0a and ROM0b, the outputs from ROM1a and ROM1b, the outputs from ROM2a and ROM2b, the outputs from ROM3a and ROM3b, the outputs from ROM4a and ROM4b, the outputs from ROM5a and ROM5b, the outputs from ROM6a and ROM6b, and the outputs from ROM7a and ROM7b, respectively, and the accumulation circuits output the results of accumulation as the result of DCT operation when the DCT operation is performed or as the data to be input to the second butterfly operation circuit 116 to obtain the result of inverse DCT operation when the inverse DCT operation is performed. The second butterfly operation circuit 116 is identical to the second butterfly operation circuit 106 of the first embodiment except that it outputs 16-bit data.

In the DCT processor of this fourth embodiment, the pixel data, which is input to the processor for each row or column of the image data of an N×M unit block, is sliced for every two bits, and the first butterfly operation circuit 113 subjects the sliced two-bit data to the same butterfly operation as that described for the first embodiment when the DCT operation is to be performed and the N or M as the number of pixel data in the row or column to be input is a power of 2. In the cases other than mentioned above, no butterfly operation is performed. The ROM address generation circuit 114 adds header addresses to two pieces of bit strings each comprising the data of each one bit of the plural 2-bit outputs from the first butterfly operation circuit 113, thereby generating two addresses, and outputs one of them to the ROM0a~ROM7a, and the other to the ROM0b~ROM7b. The ROM0a~ROM7b and the ROM0b~ROM7b output the partial products to be used for the DCT operation or the inverse DCT operation corresponding to the input addresses, respectively. Each of the accumulation circuits 52a~52h accumulates the outputs from the corresponding two ROMs placed in parallel, and outputs the result. When the inverse DCT is to be performed and the N or M as the number of pixel data in the input row or column is a power of 2, the second butterfly operation circuit 116 performs the same inverse DCT operation as described for the first embodiment on the data outputted from the accumulation circuits 52a~52h, and rearranges the results of operation according to the order of the input pixel data. In the cases other than mentioned above, the circuit 116 performs no butterfly operation, and rearranges the data outputted from the accumulation circuits 52a~52h according to the order of the input pixel data.

According to this fourth embodiment, since the butterfly operation is performed when the N or M as the number of pixel data in the input row or column is a power of 2, FFT can be applied to the matrix operation, and the number of data used for obtaining the DCT operation and the inverse DCT operation, which data are to be stored in the ROM0a~ROM7a and the ROM0a~ROM7a, can be reduced, whereby the ROM capacity can be reduced as in the first embodiment.

Further, the header addresses are added to the addresses which are constituted by the respective bits of the plural pieces of two-bit pixel data outputted from the first butterfly operation circuit 113, such that all of the addresses are arranged continuously. Therefore, mapping of data in the ROM is performed with efficiency, and the ROM capacity is reduced also when the input pixel data has 16 bits, as in the first embodiment.

While in this fourth embodiment the DCT processor according to the first embodiment is modified so that it receives 16-bit data, the DCT processors according to the second and third embodiment may be modified so that they receive 16-bit data. Also in this case, the same effects as those provided by the fourth embodiment are achieved.

Further, while in the first to fourth embodiments the data input to the bit slice circuit has 8 bits or 16 bits, the number of bits of input pixel data is not restricted thereto, and the same effects as those obtained by the aforementioned embodiments are achieved by adjusting the unit of bits to be sliced by the bit slice circuit or the number of ROMs included in the RAC.

In the DCT processors according to the first to fourth embodiments, when the value of N or M is other than 8, i.e., when it is larger than the upper limit, the operations of means to be unused, such as ROMs and accumulation circuits, may be halted. Thereby, the power consumption by the unnecessary means such as ROMs and accumulation circuits is reduced.

Further, while in the first to fourth embodiments ROMs are employed as means for outputting the result of multiplication, a combinational circuit which receives an address and outputs the result of multiplication corresponding to the address may be employed instead of the ROMs. Also in this case, the same effects as those provided by the aforementioned embodiments are achieved.

Further, while in the first to fourth embodiments the unit block of input image data is 8×8 pixels at the maximum, the maximum size of the unit block may be other than 8×8 pixels. Also in this case, the same effects as those provided by the aforementioned embodiments are achieved by increasing or decreasing the number of sets of ROMs and accumulation circuits, and the size of each ROM.

Applicability in Industory

As described above, the DCT processor according to the present invention is available as a DCT processor included in a video data coding apparatus or a video data decoding apparatus and, particularly, it is suited for a DCT processor included in an apparatus performing coding or decoding based on MPEG (Moving Picture Coding Experts Group).

What is claimed is:

1. A DCT processor performing one-dimensional DCT operation or one-dimensional inverse DCT operation on pixel data of image data in unit blocks each comprising N×M pixels (N,M: arbitrary integers from 1 to 8), comprising:

bit slice means for receiving the pixel data of the image data in each N×M unit block for each row or column, and slicing, bit by bit, the respective pixel data constituting the input rows or columns, and outputting the sliced pixel data;

control means for outputting a control signal which includes the number of input pixel data that is the number of pixel data constituting each input row or column, and a value indicating that either the DCT operation or the inverse DCT operation is to be performed;

first butterfly operation means for subjecting the output data from the bit slice means to the butterfly operation and outputting the result of the butterfly operation in the case where the control signal outputted from the control means indicates that the number of input pixel data is a power of 2 and that the DCT operation is to be performed, and in the cases other than mentioned above, said first butterfly operation means performing no butterfly operation and outputting the output data of the bit slice means as it is;

address generation means for generating addresses on the basis of bit strings obtained from the output data of the first butterfly operation means, and the number of input pixel data and the value indicating that either the DCT operation or the inverse DCT operation is to be performed, which are included in the control signal;

operation means having eight sets of multiplication result output means and accumulation means, said multiplication result output means outputting the results of multiplication to be used for obtaining the results of the one-dimensional DCT and inverse DCT operations, in accordance with the above-described addresses, and said accumulation means accumulating the output data from the multiplication result output means and outputting the accumulated data; and second butterfly operation means for subjecting the output data from the operation means to the butterfly operation and outputting the result of the butterfly operation after rearranging it according to the order of input pixel data in the case where the control signal outputted from the control means indicates that the number of input pixel data is a power of 2 and that the inverse DCT operation is to be performed, and in the cases other than mentioned above, said second butterfly operation means performing no butterfly operation and outputting the output data of the operation means after rearranging it according to the order of input pixel data.

2. A DCT processor as described in claim 1 wherein, on the basis of the output data from the first butterfly operation means, and the number of input pixel data, and the value indicating that either the DCT operation or the inverse DCT operation is to be performed, said address generation means generates addresses as follows:

when the control signal indicates that the number of input pixel data is any of 7, 6, 5, and 3, said address generation means generates an address by adding a header address of 2 bits, 3 bits, 4 bits, or 6 bits which indicates the value of the number of input pixel data including the value indicating either the DCT operation or the inverse DCT operation, to a bit string of 7 bits, 6 bits, 5 bits, or 3 bits which is constituted based on the output data from the first butterfly operation means, respectively;

when the control signal indicates that the number of input pixel data is any of 8, 4, and 2 and the DCT operation is to be performed, said address generation means generates an address by adding a header address of 5 bits, 7 bits, or 8 bits which indicates the value of the number of input pixel data including the value indicating that the DCT operation is to be performed, to a bit string of 4 bits, 2 bits, or 1 bit which is constituted based on the result of addition obtained in the butterfly operation by the butterfly operation means, and to a bit string of 4 bits, 2 bits, or 1 bit which is constituted based on the result of subtraction obtained in the butterfly operation, respectively;

when the control signal indicates that the number of input pixel data is any of 8, 4, and 2 and the inverse DCT operation is to be performed, said address generation means generates an address by adding a header address of 5 bits, 7 bits, or 8 bits which indicates the value of the number of input pixel data including the value indicating that the inverse DCT operation is to be performed, to a bit string of 4 bits, 2 bits, or 1 bit which is constituted based on the output of 8 bits, 4 bits, or 2 bits from the first butterfly operation means, respectively; and said header addresses are bit strings which permit all of the addresses obtained by adding the header addresses to the addresses based on the output data from the first butterfly operation means, to become continuous addresses.

3. A DCT processor as described in claim 1, wherein said multiplication result output means outputs the results of multiplication as follows:

when the control signal outputted from the control means indicates that the number of input pixel data is a power of 2 and the DCT operation is to be performed, said multiplication result output means outputs the result of multiplication with respect to the bit strings obtained from the output data of the first butterfly operation means, according to the DCT matrix operation using fast Fourier transform;

when the control signal outputted from the control means indicates that the number of input pixel data is a value other than a power of 2 and the DCT operation is to be performed, said multiplication result output means outputs the result of multiplication with respect to the bit strings obtained from the output data of the first butterfly operation means, according to the DCT matrix operation;

when the control signal outputted from the control means indicates that the number of input pixel data is a power of 2 and the inverse DCT operation is to be performed, said multiplication result output means outputs the result of multiplication with respect to the bit strings obtained from the output data of the first butterfly operation means, according to the inverse DCT matrix operation using fast Fourier transform; and when the control signal outputted from the control means indicates that the number of input pixel data is a value other than a power of 2 and the inverse DCT operation is to be performed, said multiplication result output means outputs the result of multiplication with respect to the bit strings obtained from the output data of the first butterfly operation means, according to the inverse DCT matrix operation.

4. A DCT processor as described in claim 1 wherein, when the control signal indicates that the number of input pixel data is a value other than 8, the operation of means which is not used for the operation is halted.

5. A DCT processor as described in claim 1 wherein:
said bit slice means receives 16-bit data as each pixel data to be input, slices this 16-bit data for every two bits, and outputs the sliced data; and
said operation means is provided with, as each of the multiplication result output means, two multiplication result output units placed in parallel with each other, each outputting the result of multiplication, and data obtained by adding the outputs of the two multiplication result output units is accumulated by the corresponding accumulation means.

6. A DCT processor performing one-dimensional DCT operation on pixel data of image data in unit blocks each comprising NXM pixels (N,M: arbitrary integers not less than 1), comprising:
bit slice means for receiving the pixel data of the image data in each N×M unit block for each row or column, and slicing, bit by bit, the respective pixel data constituting the input rows or columns, and outputting the sliced pixel data;
control means for outputting a control signal which indicates the number of input pixel data that is the number of pixel data constituting each input row or column;
butterfly operation means for performing butterfly operation on the output data from the bit slice means and outputting the result of the butterfly operation in the case where the control signal outputted from the control means indicates that the number of input pixel data is a power of 2, and in the cases other than mentioned above, said butterfly operation means performing no butterfly operation and outputting the output data of the bit slice means as it is;
address generation means for generating addresses by using bit strings obtained from the output data of the first butterfly operation means, and the number of input pixel data included in the control signal;
operation means having plural sets of multiplication result output means and accumulation circuits, as many as the maximum value of the number of input pixel data, said multiplication result output means outputting the results of multiplication to be used for obtaining the result of one-dimensional DCT operation, in accordance with the above-described addresses, and said accumulation circuits accumulating the results of multiplication outputted from the respective multiplication result output means and outputting the accumulated results; and
output means for rearranging the output data of the operation means according to the order of input pixel data, and outputting the rearranged data as the result of one-dimensional DCT operation.

7. A DCT processor as described in claim 6 wherein, on the basis of the output data from the first butterfly operation means and the number of input pixel data, said address generation means generates addresses as follows:
when the control signal indicates that the number of input pixel data is a value other than a power of 2, said address generation means generates an address by adding a header address for indicating the number of input pixel data, to an address having the number of bits equal to the number of input pixel data, which is constituted based on the output data from the first butterfly operation means;
when the control signal indicates that the number of input pixel data is a power of 2, said address generation means generates an address by adding a header address for indicating the number of input pixel data, to a bit string having the number of bits equal to half of the number of input pixel data, which is constituted based on the result of the addition obtained in the butterfly operation by the first butterfly operation means, and to a bit string having the number of bits equal to half of the number of input pixel data, which is constituted based on the result of the subtraction obtained in the butterfly operation; and
said header addresses are bit strings which permit all of the addresses obtained by adding the header addresses to the addresses based on the output data from the first butterfly operation means, to become continuous addresses and have the number of bits equal to the maximum value of the number of input pixel data.

8. A DCT processor as described in claim 7, wherein:
the unit block of the image data to be input to the bit slice means is a unit block each comprising N×M pixels (N,M: arbitrary integers from 1 to 8); and
said operation means includes eight sets of multiplication result output means and accumulation means, which is equal to the maximum value of the number of input pixel data.

9. A DCT processor as described in claim 6, wherein said butterfly operation means performs butterfly operation for outputting the values obtained by sequentially adding and subtracting the pixel data, which have been input for each row or column to the bit slice means and sliced bit by bit to be output, starting from the both ends of the input row or column toward the inside.

10. A DCT processor as described in claim 9, wherein:
the unit block of the image data to be input to the bit slice means is a unit block each comprising N×M pixels (N,M: arbitrary integers from 1 to 8); and
said operation means includes eight sets of multiplication result output means and accumulation means, which is equal to the maximum value of the number of input pixel data.

11. A DCT processor as described in claim 6, wherein said multiplication result output means outputs the result of multiplication as follows:
when the control signal outputted from the control means indicates that the number of input pixel data is a power of 2, said multiplication result output means outputs the result of multiplication with respect to the bit strings obtained from the output data of the first butterfly operation means according to the DCT matrix operation using fast Fourier transform; and
when the control signal indicates that the number of input pixel data is a value other than a power of 2, said multiplication result output means outputs the result of multiplication with respect to the bit strings obtained from the output data of the first butterfly operation means according to the DCT matrix operation.

12. A DCT processor as described in claim 11, wherein:
the unit block of the image data to be input to the bit slice means is a unit block each comprising N×M pixels (N,M: arbitrary integers from 1 to 8); and
said operation means includes eight sets of multiplication result output means and accumulation means, which is equal to the maximum value of the number of input pixel data.

13. A DCT processor as described in claim 6 wherein:
the unit block of the image data to be input to the bit slice means is a unit block each comprising N×M pixels (N,M: arbitrary integers from 1 to 8); and
said operation means includes eight sets of multiplication result output means and accumulation means, which is equal to the maximum value of the number of input pixel data.

14. A DCT processor as described in claim 6 wherein, when the control signal indicates that the number of input pixel data is equal to a value other than the maximum value of the number of input pixel data, the operation of means to be unused is halted.

15. A DCT processor as described in claim 6, wherein:
said bit slice means receives 16-bit data as each pixel data to be input, slices this 16-bit data for every two bits, and outputs the sliced data; and
said operation means is provided with, as each of the multiplication result output means, two multiplication result output units placed in parallel with each other, each outputting the result of multiplication, and data obtained by adding the outputs of the two multiplication result output units is accumulated by the corresponding accumulation means.

16. A DCT processor performing one-dimensional inverse DCT operation on pixel data of image data in unit blocks each comprising N×M pixels (N,M: arbitrary integers not less than 1), comprising:
bit slice means for receiving the pixel data of the image data in each N×M unit block for each row or column, and slicing, bit by bit, the respective pixel data constituting the input rows or columns, and outputting the sliced pixel data;
control means for outputting a control signal which includes the number of input pixel data that is the number of pixel data constituting each input row or column;
address generation means for generating addresses using bit strings obtained from the output data of the bit slice means, and the number of input pixel data included in the control signal;
operation means having plural sets of multiplication result output means and accumulation circuits, as many as the maximum value of the number of input pixel data, said multiplication result output means outputting the results of multiplication to be used for obtaining the result of one-dimensional DCT operation in accordance with the above-described addresses, and said accumulation circuits accumulating the results of multiplication outputted from the respective multiplication result output means and outputting the accumulated results; and
butterfly operation means for performing butterfly operation on the output data from the operation means and outputting the result of the butterfly operation after rearranging it according to the order of input pixel data in the case where the control signal outputted from the control means indicates that the number of input pixel data is a power of 2, and in the cases other than mentioned above, said butterfly operation means performing no butterfly operation and outputting the output data of the operation means after rearranging it according to the order of input pixel data.

17. A DCT processor as described in claim 16 wherein, on the basis of the output data from the bit slice means and the number of input pixel data, said address generation means generates addresses as follows:
when the control signal indicates that the number of input pixel data is a value other than a power of 2, said address generation means generates an address by adding a header address for indicating the number of input pixel data, to an address having the number of bits equal to the number of input pixel data, which is constituted based on the output data of the bit slice means;
when the control signal indicates that the number of input pixel data is a power of 2, said address generation means generates an address by adding a header address for indicating the number of input pixel data, to a bit string having the number of bits equal to half of the number of input pixel data, which is constituted based on the output data from the bit slice means; and
said header addresses are bit strings which permit all of the addresses obtained by adding the header addresses to the addresses based on the output data of the bit slice means to become continuous addresses and have the number of bits equal to the maximum value of the number of input pixel data constituting the input row or column.

18. A DCT processor as described in claim 16, wherein said butterfly operation means performs butterfly operation for outputting the value obtained by addition and the value obtained by subtraction, which addition and subtraction are performed between the value obtained by accumulating the result of multiplication based on the odd-numbered pixel data amongst the pixel data input for each row or column, and the value obtained by accumulating the result of multiplication based on the even-numbered pixel data.

19. A DCT processor as described in claim 16, wherein said multiplication result output means outputs the result of multiplication as follows:
when the control signal outputted from the control means indicates that the number of input pixel data is a power of 2, said multiplication result output means outputs the result of multiplication with respect to the bit strings obtained from the output data of the first butterfly operation means according to the inverse DCT matrix operation using fast Fourier transform; and
when the control signal indicates that the number of input pixel data is a value other than a power of 2, said multiplication result output means outputs the result of multiplication with respect to the bit strings obtained from the output data of the first butterfly operation means according to the inverse DCT matrix operation.

20. A DCT processor as described in claim 16, wherein:
the unit block of the image data to be input to the bit slice means is a unit block each comprising N×M pixels (N,M: arbitrary integers from 1 to 8); and
said operation means includes eight sets of multiplication result output means and accumulation means, which is equal to the maximum value of the number of input pixel data.

21. A DCT processor as described in claim 16, wherein:
said bit slice means receives 16-bit data as each pixel data to be input, slices this 16-bit data for every two bits, and outputs the sliced data; and
said operation means is provided with, as each of the multiplication result output means, two multiplication result output units placed in parallel with each other, each outputting the result of multiplication, and data obtained by adding the outputs of the two multiplication result output units is accumulated by the corresponding accumulation means.

22. A DCT processor as described in claim 16, wherein, when the control signal indicates that the number of input pixel data is equal to a value other than the maximum value of the number of input pixel data, the operation of means to be unused is halted.

* * * * *